(12) United States Patent
Takakubo

(10) Patent No.: US 9,429,767 B2
(45) Date of Patent: Aug. 30, 2016

(54) IMAGING OPTICAL SYSTEM

(71) Applicant: HOYA CORPORATION, Tokyo (JP)

(72) Inventor: Yutaka Takakubo, Saitama (JP)

(73) Assignee: HOYA CORPORATION, Tokyo (JP)

( * ) Notice: Subject to any disclaimer, the term of this patent is extended or adjusted under 35 U.S.C. 154(b) by 4 days.

(21) Appl. No.: 14/677,380

(22) Filed: Apr. 2, 2015

(65) Prior Publication Data

US 2015/0309328 A1  Oct. 29, 2015

(30) Foreign Application Priority Data

Apr. 23, 2014 (JP) ................. 2014-089109

(51) Int. Cl.
*G02B 27/64* (2006.01)
*G02B 13/00* (2006.01)
*G02B 15/177* (2006.01)

(52) U.S. Cl.
CPC ......... *G02B 27/646* (2013.01); *G02B 13/0065* (2013.01); *G02B 15/177* (2013.01)

(58) Field of Classification Search
CPC .. G02B 27/64; G02B 27/646; G02B 13/001; G02B 13/0015; G02B 13/0055; G02B 13/0065; G02B 15/14; G02B 15/16; G02B 15/117; G02B 17/08; H04N 5/23287
USPC ......... 359/554, 557, 726; 348/208.4, 208.99, 348/208.11; 396/55
See application file for complete search history.

(56) References Cited

U.S. PATENT DOCUMENTS

| 9,335,560 B2 * | 5/2016 | Nomura ............... G02B 27/646 |
| 9,338,357 B2 * | 5/2016 | Nomura ............. H04N 5/23287 |
| 2003/0137744 A1 * | 7/2003 | Kuwa .................... G02B 13/04 359/649 |
| 2008/0247053 A1 * | 10/2008 | Iwasawa .............. G02B 15/173 359/676 |

(Continued)

FOREIGN PATENT DOCUMENTS

| JP | 09-251127 | 9/1997 |
| JP | 2013-238848 | 11/2013 |

OTHER PUBLICATIONS

Yuichi Ozaki et al., "Development of Ultra-Thin Folded Zoom Lenses", Konika Minolta Technology Report vol. 11 (2014), 2014, pp. 111-116, together with a partial English language translation thereof.

U.S. Appl. No. 14/607,558 to Hiroshi Nomura et al., which was filed Jan. 28, 2015.

(Continued)

*Primary Examiner* — Derek S Chapel

(74) *Attorney, Agent, or Firm* — Greenblum & Bernstein, P.L.C.

(57) ABSTRACT

An imaging optical system includes a front lens group including a front lens element and a reflector element which reflects a light bundle that exits from the front lens element; and a rear lens group on the image side of the front lens group. The front lens element is a spherically-swingable lens group which suppresses image shake by spherically-swinging about a predetermined spherical-swing center in accordance with vibrations applied to the imaging optical system. The following conditions (1) and (2) are satisfied:

$$\nu d > 58 \quad (1),$$

and $$f/y > 3 \quad (2),$$

wherein νd designates the Abbe number with respect to the d-line of at least one lens element of the spherically-swingable lens group, f designates the focal length of the imaging optical system, in a state where the focal length is at a maximum, and y designates the maximum image height of the imaging plane.

11 Claims, 10 Drawing Sheets

(56) References Cited

U.S. PATENT DOCUMENTS

2013/0278785 A1 10/2013 Nomura et al.
2015/0215541 A1* 7/2015 Nomura ............... H04N 5/2254
                                                    348/208.11

OTHER PUBLICATIONS

U.S. Appl. No. 14/607,628 to Hiroshi Nomura et al., which was filed Jan. 28, 2015.

* cited by examiner

IMAGING OPTICAL SYSTEM

BACKGROUND OF THE INVENTION

1. Field of the Invention

The present invention relates to an imaging optical system provided with an image-stabilizing (anti-shake) function.

2. Description of Related Art

In recent years, there has been a demand to miniaturize the imaging units incorporated in mobile electronic devices, such as mobile phones equipped with a camera and smart devices (smart phones, tablet computers, etc.) equipped with a camera. In order to miniaturize an imaging unit, it is known in the art to configure an imaging optical system using a bending optical system which reflects (bends) light rays using a reflector element such as a prism or a mirror. Using a bending optical system in an imaging unit makes it possible to achieve a reduction in thickness (slimming down) of the imaging unit, especially in the direction of travel of the incident light emanating from an object to be photographed.

In addition, there also has been a tendency for the demand to equip imaging optical systems that use such a bending optical system with a so-called image-stabilizing (image shake correction/shake reduction) system that is designed to reduce image shake on the imaging plane that is caused by vibrations such as hand shake, etc.

The applicant of the present invention has proposed an imaging optical system in Japanese Unexamined Patent Publication No. 2013-238848 which suppresses image shake by driving (moving) a front lens element(s) that is positioned on the object side of a reflector element along a plane orthogonal to the optical axis of the front lens element(s).

Furthermore, Japanese Unexamined Patent Publication No. H09-251127 discloses an imaging optical system, in which image-stabilizing is carried out by swinging a lens element within the imaging optical system about a predetermined swing center.

However, according to the diligent research carried out by the present inventor, it was found that the imaging optical system disclosed in the above-mentioned Japanese Unexamined Patent Publication No. 2013-238848 has a tendency to deteriorate in image quality due to coma occurring when the front lens element(s) is driven (moved) along a plane orthogonal to the optical axis of the front lens element(s); and when the driving amount (movement amount) of the front lens element(s) is increased in accordance with an increase in an image-stabilizing movement amount (image-shake correction amount), the deterioration in the image quality due to coma occurring becomes more prominent. Accordingly, the driving amount (movement amount) of the front lens element(s) is restricted due to the need to balance between the driving amount of the front lens element(s) and the suppression of aberration fluctuations, thereby causing difficulty in increasing the image-stabilizing movement amount.

Whereas, in the imaging optical system of the above-mentioned Japanese Unexamined Patent Publication No. H9-251127, deterioration of image quality due to occurrence of coma can be reduced compared to the imaging optical system of the above-mentioned Japanese Unexamined Patent Publication No. 2013-238848. However, color shift occurs in the image due to the swinging movement of the lens element, thereby causing the resolving power (MTF: Modulation Transfer Function) of the image to deteriorate. This deterioration in the resolving power due to color shift becomes especially troublesome when the focal length of the imaging optical system is long (e.g., at the long focal length extremity).

SUMMARY OF THE INVENTION

The present invention has been devised in view of the above-described problems, and provides an imaging optical system that can achieve a superior optical quality by preventing deterioration in image quality caused by coma and by preventing a reduction in resolving power caused by color shift occurring in the image.

According to an aspect of the present invention, an imaging optical system is provided, including a front lens group including at least one front lens element, and a reflector element which reflects a light bundle that exits from the front lens element, in that order from the object side; and a rear lens group provided on the image side of the front lens group. The front lens element serves as a spherically-swingable lens group which, in an image-stabilizing operation, suppresses image shake on the imaging plane by spherically-swinging the spherically-swingable lens group about a predetermined spherical-swing center in accordance with vibrations applied to the imaging optical system. The following conditions (1) and (2) are satisfied:

$$\nu d > 58 \quad (1),$$

and $$f/y > 3 \quad (2),$$

wherein $\nu d$ designates the Abbe number with respect to the d-line of at least one lens element of the spherically-swingable lens group; f designates the focal length of the imaging optical system, in a state where the focal length is at a maximum; and y designates the maximum image height of the imaging plane.

It is desirable for the zoom lens system of the present invention to satisfy the following condition (1') from within the range of condition (1):

$$\nu d > 65 \quad (1').$$

It is desirable for the zoom lens system of the present invention to satisfy the following condition (2') from within the range of condition (2):

$$f/y > 4 \quad (2').$$

It is desirable for the following condition (3) to be satisfied:

$$-2 < SF < 0 \quad (3),$$

wherein $SF = (R2+R1)/(R2-R1)$; R1 designates the radius of curvature of the surface closest to the object side on the spherically-swingable lens group, and R2 designates the radius of curvature of the surface closest to the image side on the spherically-swingable lens group.

It is desirable for the following condition (4) to be satisfied:

$$-0.3 < (SC-R2)/f1 < 0 \quad (4),$$

wherein SC designates the distance from the surface closest to the image side on the spherically-swingable lens group to the predetermined spherical-swing center (the distance (length) along a straight imaginary line connecting the apex of the surface closest to the image side on the spherically-swingable lens group to the specified point about which the spherically-swingable lens group spherically-swings), R2 designates the radius of curvature of the surface closest to the image side on the spherically-swingable lens group, and f1 designates the focal length (or combined focal length) of the spherically-swingable lens group.

It is desirable for the spherically-swingable lens group to be a single lens element.

It is desirable for the single lens element, which serves as the spherically-swingable lens group, to have a negative refractive power.

It is desirable for the single lens element, which serves as the spherically-swingable lens group, to have a concave surface on the image side thereof.

It is desirable for the surface on the object side of the single lens element, which serves as the spherically-swingable lens group, to have a smaller refractive power than the surface on the image side thereof.

In a reference state in which the image-stabilizing operation is not carried out, it is desirable for the predetermined spherical-swing center to be positioned on an extension of an optical axis, of the spherically-swingable lens group, extending behind an underside of a reflection surface of the reflector element.

It is desirable for the front lens group to include a negative single lens element, which serves as the spherically-swingable lens group, having a concave surface on the image side thereof, the reflector element, a positive single lens element having a convex surface on the image side, and a negative single lens element having a concave surface on the object side, in that order from the object side.

It is desirable for the front lens group to include a negative single lens element, which serves as the spherically-swingable lens group, having a concave surface on the image side thereof, the reflector element, a biconcave single lens element, and a positive meniscus lens element having a convex surface on the object side.

It is desirable for the front lens group to have a negative single lens element, which serves as the spherically-swingable lens group, having a concave surface on the image side thereof, the reflector element, and a positive meniscus lens element having a convex surface on the object side.

According to the present invention, an imaging optical system is provided that can achieve a superior optical quality by preventing deterioration in image quality caused by coma and by preventing a reduction in resolving power caused by color shift occurring in the image.

The present disclosure relates to subject matter contained in Japanese Patent Application No. 2014-089109 (filed on Apr. 23, 2014) which is expressly incorporated herein in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
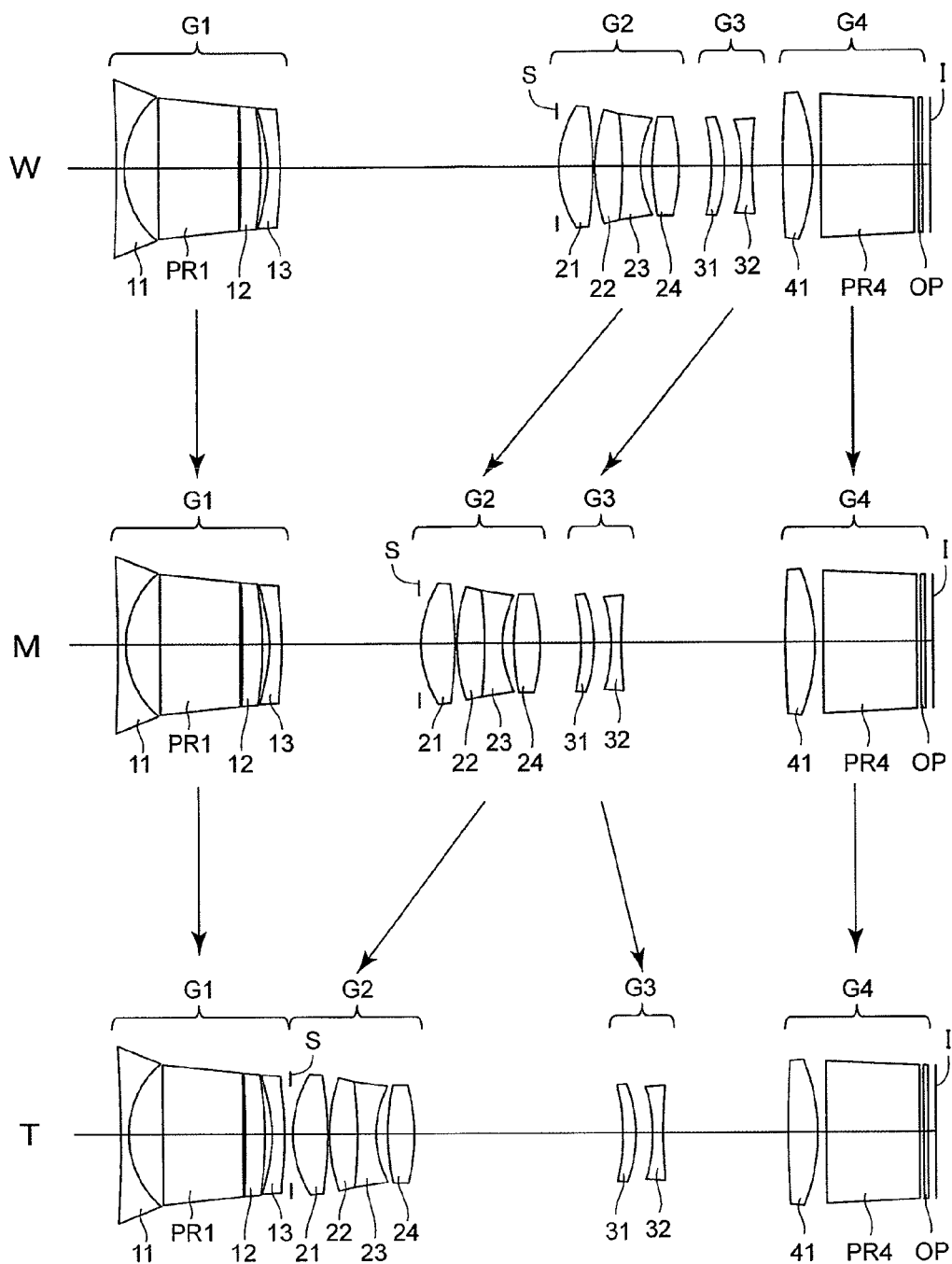
FIG. 1 shows a lens arrangement of a first numerical embodiment of an imaging optical system, according to the present invention, when focused on an object at infinity at the short focal length extremity, an intermediate focal length, and the long focal length extremity, respectively.

The imaging optical system of each of the first through seventh numerical embodiments is configured of a negative first lens group (front lens group) G1, a positive second lens group (rear lens group) G2, a negative third lens group (rear lens group) G3, and a positive fourth lens group (rear lens group) G4, in that order from the object side (i.e., an arrangement of four lens groups having a negative lens group, a positive lens group, a negative lens group and a positive lens group, in that order from the object side).

In the imaging optical system of each of the first through seventh numerical embodiments, upon zooming from the short focal length extremity (W) to the long focal length extremity (T) via an intermediate focal length (M), the distance between the first lens group G1 and the second lens group G2 decreases, the distance between the second lens group G2 and the third lens group G3 increases, and the distance between the third lens group G3 and the fourth lens group G4 increases.

The imaging optical system of the eighth numerical embodiment is configured of a negative first lens group (front lens group) G1, a positive second lens group (rear lens group) G2, a positive third lens group (rear lens group) G3', and a positive fourth lens group (rear lens group) G4, in that order from the object side (i.e., an arrangement of four lens groups having a negative lens group, a positive lens group, a positive lens group and a positive lens group, in that order from the object side).

In the imaging optical system of the eighth numerical embodiment, upon zooming from the short focal length extremity (W) to the long focal length extremity (T) via an intermediate focal length (M), the distance between the first lens group G1 and the second lens group G2 decreases, the distance between the second lens group G2 and the third lens group G3' decreases, and the distance between the third lens group G3' and the fourth lens group G4 increases.

In each of the first through eighth numerical embodiments, the first lens group G1 and the fourth lens group G4 each remains stationary relative to the image plane (does not move in the optical axis direction) upon zooming from the short focal length extremity (W) to the long focal length extremity (T) via the intermediate focal length (M).

In each of the first through eighth numerical embodiments, the second lens group G2 monotonically moves toward the object side upon zooming from the short focal length extremity (W) to the long focal length extremity (T) via the intermediate focal length (M).

In each of the first through fifth numerical embodiments, the third lens group G3 first moves toward the object side and thereafter moves slightly (returns) toward the image side upon zooming from the short focal length extremity (W) to the long focal length extremity (T) via the intermediate focal length (M).

In each of the sixth through eighth numerical embodiments, the third lens group G3 (G3') monotonically moves toward the object side upon zooming from the short focal length extremity (W) to the long focal length extremity (T) via the intermediate focal length (M).

In each of the first through fourth numerical embodiments, the first lens group (front lens group) G1 is configured of a negative single lens element (front lens element) 11 having a concave surface on the image side, a reflection prism (reflector element) PR1, a positive single lens element 12 having a convex surface on the image side, and a negative single lens element 13 having a concave surface on the object side, in that order from the object side. Both surfaces of the negative single lens element (front lens element) 11 and both surfaces of the negative single lens element 13 are aspherical surfaces.

In each of the fifth, sixth and eighth numerical embodiments, the first lens group (front lens group) G1 is configured of a negative single lens element (front lens element) 11' having a concave surface on the image side, a reflection prism (reflector prism) PR1', a biconcave negative single lens element 12', and a positive single lens element (a positive meniscus single lens element having a convex surface on the object side or a biconvex positive single lens element) 13' having a convex surface on the object side, in that order from the object side. An aspherical surface is formed on each side of the negative single lens element (front lens element) 11'.

In the seventh numerical embodiment, the first lens group (front lens group) G1 is configured of a negative single lens element (front lens element) 11" having a concave surface on the image side, a reflection prism (reflector element) PR1", and a positive meniscus single lens element 12" having a convex surface on the object side, in that order from the object side. An aspherical surface is formed on each side of the negative single lens element (front lens element) 11".

In each of the first through seventh numerical embodiments, the second lens group G2 is configured of a positive lens element 21, a positive lens element 22, a negative lens element 23, and a positive lens element 24, in that order from the object side. An aspherical surface is formed on each side of the positive lens element 21. The positive lens element 22 and the negative lens element 23 are bonded to each other to form a cemented lens.

In the eighth numerical embodiment, the second lens group G2 is configured of a positive lens element 21' and a negative lens element 22', in that order from the object side.

An aspherical surface is formed on each side of the positive lens element 21' and the negative 22'.

In each of the first through fourth numerical embodiments, the third lens group G3 is configured of a positive lens element 31, and a negative lens element 32, in that order from the object side. An aspherical surface is formed on each side of the negative lens element 32.

In each of the fifth through seventh numerical embodiments, the third lens group G3 is configured of a negative single lens element 31'.

In the eighth numerical embodiment, the third lens group G3' is configured of a positive lens element 31" and a negative lens element 32", in that order from the object side.

In each of the first through eighth numerical embodiments, the fourth lens group G4 is configured of a positive lens element 41 and a reflection prism (reflector prism) PR4, in that order from the object side. An aspherical surface is formed on each side of the positive lens element 41.

The imaging optical system of the illustrated embodiments is a bending optical system, in which the reflection prism (PR1, PR1', PR1") provided in the first lens group G1 reflects, at a substantially right-angle, light that exits from the negative single lens element (11, 11', 11"), and the reflection prism PR4 provided in the fourth lens group G4 reflects, at a substantially right-angle, light that exits from the positive lens element 41. By installing the imaging optical system, which utilizes such a bending optical system, into an imaging unit, a slimmed-down imaging unit can be achieved in which the thickness of the imaging unit is reduced, especially in the direction of travel of the incident light emanating from an object to be photographed.

Figure 10:
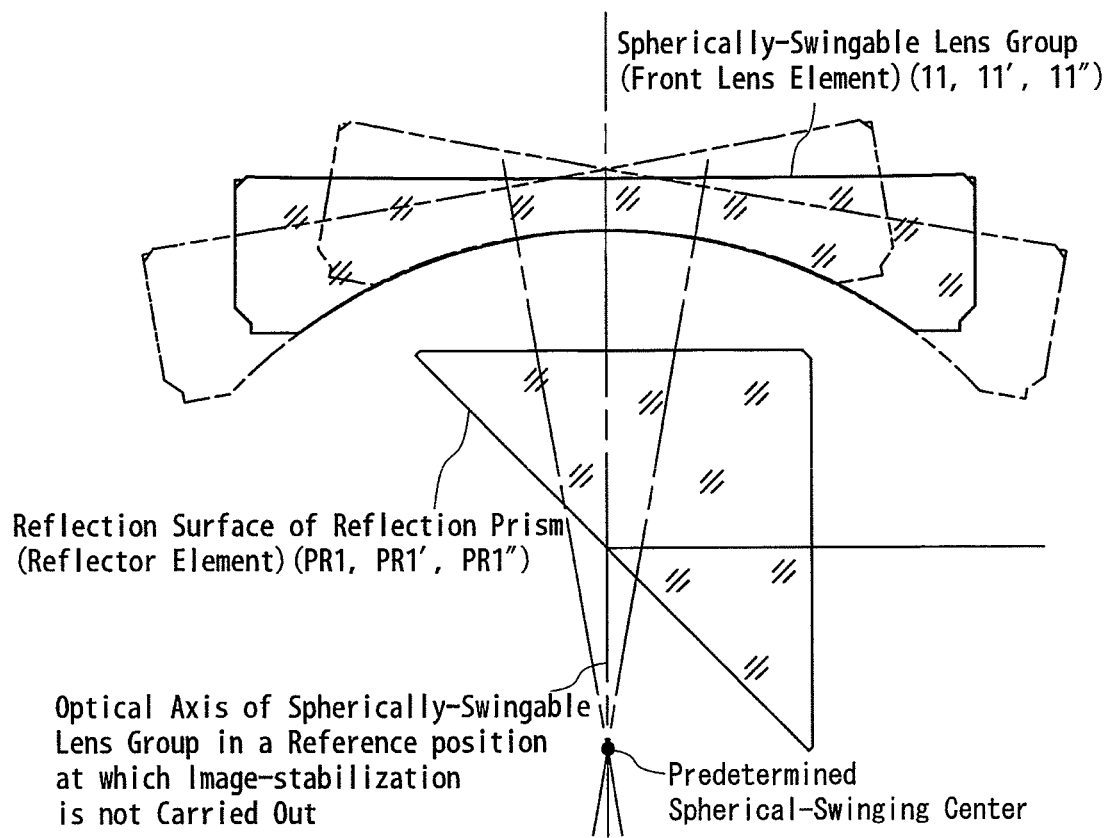
FIG. 10 schematically shows a spherically-swinging operation of a spherically-swingable lens group for carrying out an image-stabilizing operation.

In the imaging optical system of the illustrated embodiments, as shown in FIG. 10, the negative single lens element (11, 11', 11"), provided immediately in front (on the object side) of the reflection prism (PR1, PR1', PR1"), serves as a "spherically-swingable lens group", whereby image-stabilizing is carried out (in which image shake on the imaging plane I is suppressed) by spherically-swinging the spherically-swingable lens group about a predetermined spherical-swing center (point) in accordance with hand-shake, etc., applied on the imaging optical system. In a reference state in which a image-stabilizing operation is not carried out, the predetermined spherical-swing center is positioned on an extension of the optical axis, of the spherically-swingable lens group, extending behind an underside of the reflection surface of the reflection prism (PR1, PR1', PR1"). In FIG. 10, the spherically-swingable lens group (11, 11', 11") is shown in the reference state in which image-stabilizing is not carried out with a solid line, and the spherically-swingable lens group (11, 11', 11") is shown in spherically swung states about the predetermined spherical-swing center with two-dot chain lines; the spherical swinging angle of spherically-swingable lens group (11, 11', 11") is exaggeratedly indicated.

Although not shown in the drawings, the mechanism for spherically-swinging the spherically-swingable lens group can be configured of a movable frame which holds the spherically-swingable lens group (11, 11', 11"), a support member which holds the reflection prism (PR1, PR1', PR1") and does not move relative to the optical axis in a reference state in which image-stabilizing is not carried out by the spherically-swingable lens group, and a support mechanism which supports the movable frame relative to the support member in a spherically-swingable manner about a predetermined point (predetermined spherical-swing center).

Furthermore, in the imaging optical system of the illustrated embodiments, although the spherically-swingable lens group (front lens element) is configured of a negative single lens element (11, 11', 11") having a concave surface on the image side, it is possible to configure the spherically-swingable lens group (front lens element) from two or more lens elements.

As described in the illustrated embodiments of the imaging optical system, by carrying out an image-stabilization operation by spherically-swinging the spherically-swingable lens group (11, 11', 11"), deterioration in image quality due to coma occurring can be reduced compared to the image-stabilizing mechanism of the above-mentioned Japanese Unexamined Patent Publication No. 2013-238848.

Furthermore, the imaging optical system of the illustrated embodiments can prevent a deterioration in the resolving power (MTF: Modulation Transfer Function), caused by a color shift in the image, and can successfully achieve a superior optical quality even if the spherically-swingable lens group is spherically swung to carry out image-stabilization by appropriately determining the material and shape of the spherically-swingable lens group (11, 11', 11").

Condition (1) specifies the Abbe number with respect to the d-line of the negative single lens element (11, 11', 11") (in the case where the spherically-swingable lens group is configured of two or more lens elements, at least one lens element thereof) that serves as the spherically-swingable lens group.

Condition (2) specifies the ratio of the focal length of the imaging optical system, in a state where the focal length is at a maximum, to the maximum image height of the imaging plane I, so that the focal length of the imaging optical system, in a state where the focal length is at a maximum, is normalized to the image sensor size.

The amount of color shift that occurs in the image when spherically-swinging the spherically-swingable lens group (11, 11', 11") is determined by the dispersion of the material used in the spherically-swingable lens group (11, 11', 11") and the focal length of the imaging optical system.

Accordingly, by forming the spherically-swingable lens group (11, 11', 11") from a low-dispersion material (a material having a large Abbe number at the d-line) that satisfies condition (1), the amount of color shift that occurs during the spherical-swinging of the spherically-swingable lens group can be reduced.

On the other hand, the adverse influence of the color shift on the image quality, when the spherically-swingable lens group (11, 11', 11") is spherically swung, is evident in the case where the focal length of the imaging optical system is long. In the case where the imaging optical system is provided with a zooming function, as in the illustrated embodiments, the color shift amount becomes maximum at the long focal length extremity. Each imaging optical system of the illustrated embodiments has a long focal length that satisfies condition (2), so that a reduction in color shift during a spherical-swinging operation (of the spherically-swingable lens group) can be confirmed. In other words, by simultaneously satisfying condition (1) and condition (2), even in the case where, for example, the focal length of the imaging optical system is long, the deterioration in the resolving power due to color shift occurring during a spherical-swinging operation (of the spherically-swingable lens group) and a superior optical quality can be reliably achieved. Furthermore, even in the case where condition (2) is not satisfied, since the focal length of the imaging optical system is short, any color shift occurring during a spherical-swinging operation (of the spherically-swingable lens group) would have almost no adverse effect on the imaging quality.

Condition (3) specifies the shape factor of the negative single lens element (11, 11', 11") (the entire spherically-swingable lens group in the case where the spherically-swingable lens group is configured of two or more lens elements) that serves as the spherically-swingable lens group. More specifically, condition (3) relates to the image-stabilization (anti-shake) sensitivity (the spherical-swinging angle of the spherically-swingable lens group necessary for changing the light-ray incident angle relative to the imaging optical system by a unit of angle) of the spherically-swingable lens group (11, 11', 11"). By satisfying condition (3), a desired image-stabilization angle can be obtained while suppressing aberration fluctuations during a spherically-swinging operation (of the spherically-swingable lens group) thereby achieving a superior optical quality.

If the upper limit of condition (3) is exceeded, a large amount of aberration fluctuations occur during a spherical-swinging operation of the spherically-swingable lens group (11, 11', 11"), thereby deteriorating the optical quality.

If the lower limit of condition (3) is exceeded, the image-stabilizing sensitivity of the spherically-swingable lens group (11, 11', 11") becomes too low, so that it becomes difficult to achieve a desired image-stabilization angle. Namely, in order to achieve a desired image-stabilization angle, it becomes necessary to increase the spherical-swing angle of the spherically-swingable lens group (11, 11', 11"); whereas, since a large space cannot be attained between the spherically-swingable lens group (11, 11', 11") and the reflection prism (PR1, PR1', PR1") due to the slim design of the imaging optical system, the image-stabilization angle is naturally restricted.

Condition (4) specifies the distance from the surface closest to the image side on the spherically-swingable lens group (11, 11', 11") to the predetermined spherical-swing center about which the spherically-swingable lens group spherically-swings (the distance (length) along a straight imaginary line connecting the apex of the surface closest to the image side on the spherically-swingable lens group (11, 11', 11") to the predetermined spherical-swing center about which the spherically-swingable lens group spherically-swings); namely, condition (4) relates to the spherical-swing center position that is normalized to the focal length of the spherically-swingable lens group (11, 11', 11"). By satisfying condition (4), an effective image-stabilizing (anti-shake correcting) effect can be obtained, a superior optical quality can be achieved due to the aberration fluctuations being suppressed during a spherical swing operation of the spherically-swingable lens group, and a slimmed-down imaging unit can be achieved.

If the upper limit of condition (4) is exceeded, the predetermined spherical-swing center becomes too close to the spherically-swingable lens group (11, 11', 11"), the displacement of the image when the spherically-swingable lens group (11, 11', 11") is spherically swung becomes small, so that an effective image-stabilizing (anti-shake correcting) effect cannot be obtained.

If the lower limit of condition (4) is exceeded, the distance from the spherically-swingable lens group (11, 11', 11") to the predetermined spherical-swing center becomes too large, so that it becomes difficult to slim down the size of the imaging unit, and fluctuations in aberrations increase.

In each imaging optical system of the illustrated embodiments, the surface on the object side of the negative single lens element (11, 11', 11"), which constitutes the spherically-swingable lens group, has a smaller refractive power than that of the surface on the image side thereof. Accordingly, aberration fluctuations can be suppressed during a spherical-swinging operation (of the spherically-swingable lens group), thereby achieving a superior optical quality. If the surface on the object side of the negative single lens element (11, 11', 11") has a larger refractive power than that of the surface on the image side thereof, coma that occurs during a spherical-swinging operation (of the spherically-swingable lens group) increases.

EMBODIMENTS

Specific numerical embodiments will be herein discussed. In the tables, f designates the focal length of the entire optical system, FNO. designates the f-number, W designates the half angle of view (°), Y designates the image height, L designates the overall length of the lens system, fB designates the backfocus, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the focal length, the f-number, the half angle-of-view, the image height, the overall length of the lens system, the backfocus, and the distance d between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIG. 1 and Tables 1 through 5 show a first numerical embodiment of an imaging optical system according to the present invention. FIG. 1 shows a lens arrangement of the first numerical embodiment of the imaging optical system when focused on an object at infinity at the short focal length extremity, an intermediate focal length, and the long focal length extremity, respectively. Table 1 shows the lens surface data, Table 2 shows various lens-system data, Table 3 shows the aspherical surface data, and Table 4 shows lens group data. Table 5 shows data on aberrations (color shift) that occurred during an image-stabilizing driving operation and data on the image-stabilizing sensitivity by indicating various center image heights at the telephoto extremity with respect to an image-stabilizing angle of 1 degree. Namely, in Tables 5, 10, 15, 20, 25, 30, 35, 40 and 45, of the first through eighth numerical embodiments and the comparative embodiment, respectively, the values of the imaging positions at the C-line and at the g-line indicate the imaging positions (intersection points between the imaging plane and the principal rays) of the axial light bundle at the respective wavelengths of the C-line and the g-line. Furthermore, the indicated values of the imaging positions at the C-line and at the g-line are "based on the d-line", i.e., indicate distances from the imaging positions at the d-line.

The imaging optical system of the first numerical embodiment is configured of a negative first lens group (front lens group) G1, a positive second lens group (rear lens group) G2, a negative third lens group (rear lens group) G3, and a positive fourth lens group (rear lens group) G4, in that order from the object side (i.e., an arrangement of four lens groups having a negative lens group, a positive lens group, a negative lens group and a positive lens group, in that order from the object side). A diaphragm S, which is positioned on a plane that is orthogonal to the optical axis and is tangent to the surface closest to the object side on the second lens group G2, moves with the second lens group G2 along the optical axis. An optical filter OP is provided between the fourth lens group G4 and the imaging plane I.

The first lens group G1 is configured of a biconcave negative lens element (front lens element) 11, a reflection prism (reflector element) PR1, a positive meniscus lens element 12 having a convex surface on the image side, and a negative meniscus lens element 13 having a convex surface on the image side, in that order from the object side. Aspherical surfaces are formed on both sides of the biconcave negative lens element (front lens element) 11 and both sides of the negative meniscus lens element 13. The biconcave negative lens element (front lens element) 11 constitutes a spherically-swingable lens group for suppressing (stabilizing) image shake occurring on the imaging plane I by spherically swinging about a predetermined point (spherical-swing center) in accordance with vibrations/hand-shake, etc., that are applied against the imaging optical system.

The second lens group G2 is configured of a biconvex positive lens element 21, a biconvex positive lens element 22, a biconcave negative lens element 23, and a biconvex positive lens element 24, in that order from the object side. An aspherical surface is formed on each side of the biconvex positive lens element 21. The biconvex positive lens element 22 and the biconcave negative lens element 23 are bonded to each other to form a cemented lens.

The third lens group G3 is configured of a positive meniscus lens element 31 having a convex surface on the image side, and a biconcave negative lens element 32, in that order from the object side. An aspherical surface is formed on each side of the biconcave negative lens element 32.

The fourth lens group G4 is configured of a biconvex positive lens element 41 and a reflection prism (reflector element) PR4, in that order from the object side. An aspherical surface is formed on each side of the biconvex positive lens element 41.

TABLE 1

LENS SURFACE DATA

| Surf. No. | r | d | N(d) | vd |
|---|---|---|---|---|
| 1* | −187.912 | 0.400 | 1.49710 | 81.6 |
| 2* | 4.834 | 1.676 | 1.00000 | |
| 3 | ∞ | 4.000 | 1.91082 | 35.3 |
| 4 | ∞ | 0.093 | 1.00000 | |
| 5 | −100.000 | 0.967 | 1.94594 | 18.0 |
| 6 | −19.840 | 0.347 | 1.00000 | |
| 7* | −7.535 | 0.600 | 1.72903 | 54.0 |
| 8* | −18.248 | d8 | 1.00000 | |
| 9 (Diaphragm) | ∞ | 0.000 | 1.00000 | |
| 10* | 5.626 | 1.670 | 1.59201 | 67.0 |
| 11* | −16.413 | 0.100 | 1.00000 | |
| 12 | 9.186 | 1.349 | 1.49700 | 81.6 |
| 13 | −22.807 | 0.904 | 1.91082 | 35.3 |
| 14 | 5.366 | 0.574 | 1.00000 | |
| 15 | 12.436 | 1.307 | 1.59349 | 67.0 |

TABLE 1-continued

LENS SURFACE DATA

| Surf. No. | r | d | N(d) | νd |
|---|---|---|---|---|
| 16 | −9.816 | d16 | 1.00000 | |
| 17 | −10.999 | 0.649 | 1.92286 | 20.9 |
| 18 | −7.194 | 0.830 | 1.00000 | |
| 19* | −8.649 | 0.500 | 1.82080 | 42.7 |
| 20* | 22.527 | d20 | 1.00000 | |
| 21* | 44.965 | 1.462 | 1.54358 | 55.7 |
| 22* | −10.407 | 0.410 | 1.00000 | |
| 23 | ∞ | 4.600 | 1.69680 | 55.5 |
| 24 | ∞ | 0.200 | 1.00000 | |
| 25 | ∞ | 0.210 | 1.51680 | 64.2 |
| 26 | ∞ | — | | |

An asterisk (*) designates an aspherical surface which is rotationally symmetrical with respect to the optical axis.

TABLE 2

LENS-SYSTEM DATA
Zoom Ratio: 4.70

| | Short Focal Length Extremity | Intermediate Focal Length | Long Focal Length Extremity |
|---|---|---|---|
| f | 4.15 | 8.96 | 19.50 |
| FNO. | 2.48 | 3.96 | 5.85 |
| W | 36.95 | 19.03 | 8.91 |
| Y | 2.54 | 2.98 | 3.08 |
| L | 40.00 | 40.00 | 40.00 |
| fB | 0.370 | 0.370 | 0.370 |
| d8 | 13.682 | 6.762 | 0.400 |
| d16 | 1.598 | 1.989 | 10.259 |
| d20 | 1.500 | 8.030 | 6.122 |

TABLE 3

ASPHERICAL SURFACE DATA (Coefficients not shown are 0.00)

| Surf. No. | K | A4 | A6 | A8 |
|---|---|---|---|---|
| 1 | 0.0000 | −5.91655E−04 | 4.19242E−05 | −9.44752E−07 |
| 2 | −0.7783 | 1.59951E−04 | 3.21429E−05 | 4.33866E−05 |
| 7 | 0.0000 | 1.49614E−03 | −6.16539E−06 | 1.72731E−06 |
| 8 | 0.0000 | 9.64306E−04 | −2.03742E−05 | 1.21174E−06 |
| 10 | −1.6707 | 6.76523E−04 | −1.18495E−07 | |
| 11 | 0.0000 | 6.45073E−04 | −8.98571E−06 | |
| 19 | 0.0000 | −1.68757E−04 | −1.54030E−04 | −2.92815E−06 |
| 20 | 0.0000 | 2.10232E−04 | −1.12353E−04 | −4.61782E−06 |
| 21 | 0.0000 | −2.13837E−04 | | |
| 22 | 0.0000 | −7.27547E−05 | | |

TABLE 4

LENS GROUP DATA

| Lens Group | 1st Surface | Focal Length |
|---|---|---|
| 1 | 1 | −7.660 |
| 2 | 10 | 8.032 |
| 3 | 17 | −12.153 |
| 4 | 21 | 15.693 |

TABLE 5

Center Image Height at Telephoto Extremity
at 1° Image-Stabilizing Angle

| Imaging position at C-line (based on d-line) [μm] | 5.17 |
|---|---|

TABLE 5-continued

Center Image Height at Telephoto Extremity
at 1° Image-Stabilizing Angle

| Imaging position at g-line (based on d-line) [μm] | −1.28 |
|---|---|
| Color shift (C-line-g-line) [μm] | 6.45 |
| Spherical-swinging angle L1 per unit of image-stabilizing angle [°] | 1.64 |

Numerical Embodiment 2

Figure 2:
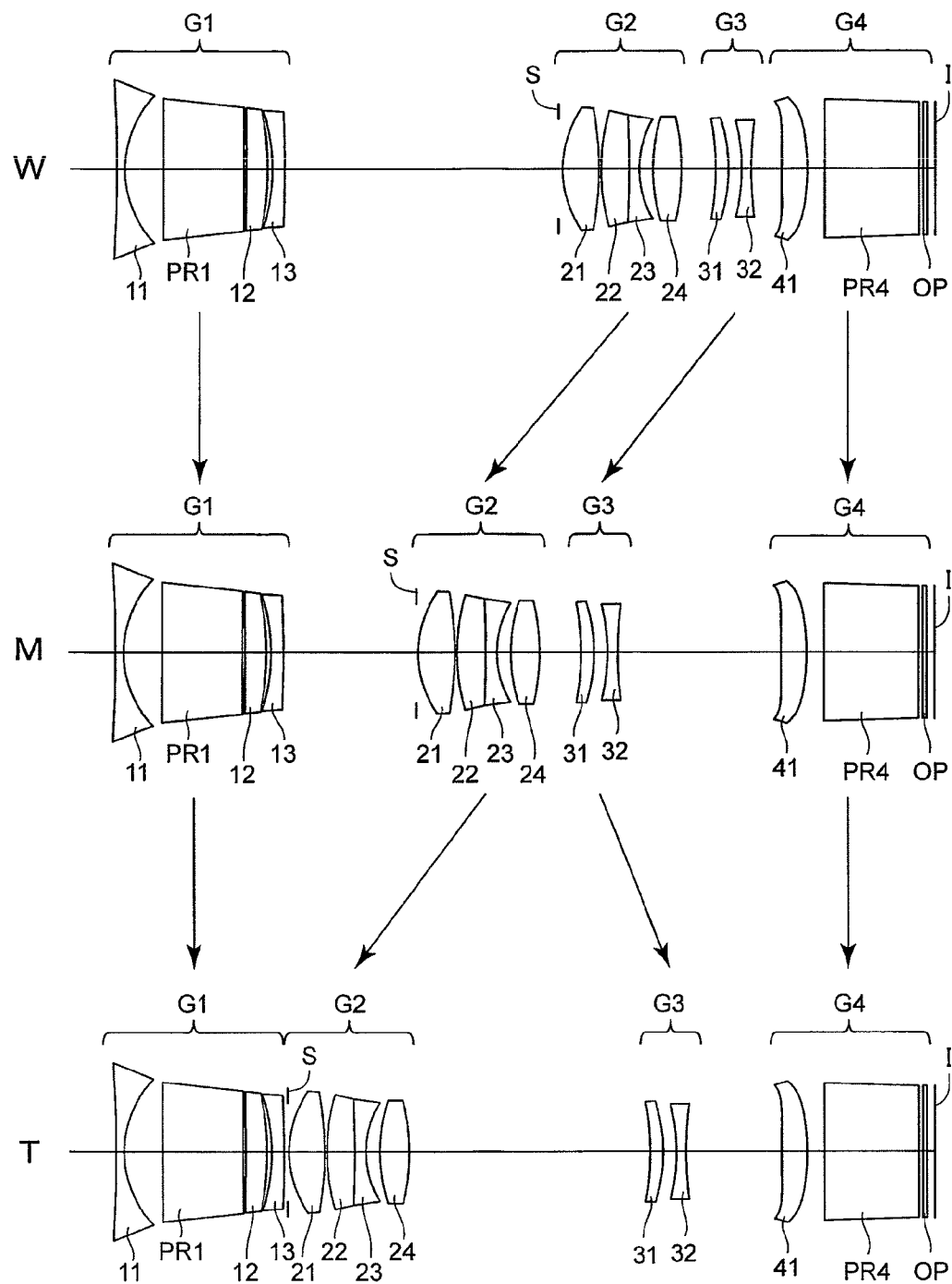
FIG. 2 shows a lens arrangement of a second numerical embodiment of an imaging optical system, according to the present invention, when focused on an object at infinity at the short focal length extremity, an intermediate focal length, and the long focal length extremity, respectively.

FIG. 2 and Tables 6 through 10 show a second numerical embodiment of an imaging optical system according to the present invention. FIG. 2 shows a lens arrangement of the second numerical embodiment of the imaging optical system when focused on an object at infinity at the short focal length extremity, an intermediate focal length, and the long focal length extremity, respectively. Table 6 shows the lens surface data, Table 7 shows various lens-system data, Table 8 shows the aspherical surface data, and Table 9 shows lens group data. Table 10 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the second numerical embodiment is the same as that of the first numerical embodiment.

TABLE 6

LENS SURFACE DATA

| Surf. No. | r | d | N(d) | νd |
|---|---|---|---|---|
| 1* | −1000.000 | 0.400 | 1.55332 | 71.7 |
| 2* | 5.137 | 1.900 | 1.00000 | |
| 3 | ∞ | 4.000 | 2.00100 | 29.1 |
| 4 | ∞ | 0.104 | 1.00000 | |
| 5 | −1000.000 | 1.061 | 1.94594 | 18.0 |
| 6 | −15.488 | 0.239 | 1.00000 | |
| 7* | −9.704 | 0.600 | 1.88202 | 37.2 |
| 8* | −80.929 | d8 | 1.00000 | |
| 9(Diaphragm) | ∞ | 0.000 | 1.00000 | |
| 10* | 5.213 | 1.801 | 1.55332 | 71.7 |
| 11* | −14.818 | 0.107 | 1.00000 | |
| 12 | 10.730 | 1.387 | 1.49700 | 81.6 |
| 13 | −60.780 | 0.539 | 1.91082 | 35.3 |
| 14 | 5.019 | 0.688 | 1.00000 | |
| 15 | 8.705 | 1.436 | 1.59349 | 67.0 |
| 16 | −11.555 | d16 | 1.00000 | |
| 17 | −14.117 | 0.644 | 1.92286 | 20.9 |
| 18 | −8.663 | 0.662 | 1.00000 | |
| 19* | −10.626 | 0.500 | 1.80139 | 45.5 |
| 20* | 18.283 | d20 | 1.00000 | |
| 21* | 438.675 | 1.263 | 1.54358 | 55.7 |
| 22* | −11.447 | 0.870 | 1.00000 | |
| 23 | ∞ | 4.600 | 1.77250 | 49.6 |
| 24 | ∞ | 0.200 | 1.00000 | |
| 25 | ∞ | 0.210 | 1.51680 | 64.2 |
| 26 | ∞ | — | | |

An asterisk (*) designates an aspherical surface which is rotationally symmetrical with respect to the optical axis.

TABLE 7

LENS-SYSTEM DATA
Zoom Ratio: 4.78

|  | Short Focal Length Extremity | Intermediate Focal Length | Long Focal Length Extremity |
|---|---|---|---|
| f | 4.10 | 8.96 | 19.60 |
| FNO. | 2.48 | 3.96 | 5.75 |
| W | 37.28 | 19.03 | 8.89 |
| Y | 2.53 | 2.97 | 3.08 |
| L | 40.50 | 40.50 | 40.50 |
| fB | 0.370 | 0.370 | 0.370 |
| d8 | 13.701 | 6.683 | 0.245 |
| d16 | 1.717 | 2.027 | 11.897 |
| d20 | 1.500 | 8.208 | 4.777 |

TABLE 8

ASPHERICAL SURFACE DATA

| Surf. No. | K | A4 | A6 | A8 | A10 |
|---|---|---|---|---|---|
| 1 | 0.0000 | −8.03276E−04 | 3.39688E−05 | −1.33401E−07 | −7.65268E−09 |
| 2 | −0.0817 | −9.89902E−04 | 1.35186E−05 | −1.53576E−08 | 1.26747E−07 |
| 7 | 0.0000 | 2.97886E−04 | −2.58625E−05 | 7.28337E−07 | 1.01046E−07 |
| 8 | 0.0000 | 5.64449E−05 | −3.58157E−05 | 2.73423E−06 | −5.07294E−08 |
| 10 | −3.3293 | 2.21688E−03 | −8.40086E−05 | 4.02543E−06 | −1.18588E−07 |
| 11 | 0.0000 | 6.61966E−04 | −1.65326E−05 | 1.14260E−06 | −6.45036E−08 |
| 19 | 0.0000 | −3.23608E−04 | −8.26526E−05 | 2.21271E−05 | −1.04279E−06 |
| 20 | 0.0000 | −9.14464E−05 | −5.08511E−05 | 1.59273E−05 | −4.98904E−07 |
| 21 | 0.0000 | 1.55851E−03 | −4.71717E−04 | 2.52328E−05 | −1.36327E−06 |
| 22 | 0.0000 | 2.08769E−03 | −4.80051E−04 | 2.06136E−05 | −7.82542E−07 |

TABLE 9

LENS GROUP DATA

| Lens Group | 1$^{st}$ Surface | Focal Length |
|---|---|---|
| 1 | 1 | −7.261 |
| 2 | 10 | 8.013 |
| 3 | 17 | −13.276 |
| 4 | 21 | 20.544 |

TABLE 10

Center Image Height at Telephoto Extremity at 1° Image-Stabilizing Angle

| | |
|---|---|
| Imaging position at C-line (based on d-line) [μm] | 5.89 |
| Imaging position at g-line (based on d-line) [μm] | −1.45 |
| Color shift (C-line - g-line) [μm] | 7.34 |
| Spherical-swinging angle L1 per unit of image-stabilizing angle [°] | 1.54 |

Numerical Embodiment 3

Figure 3:
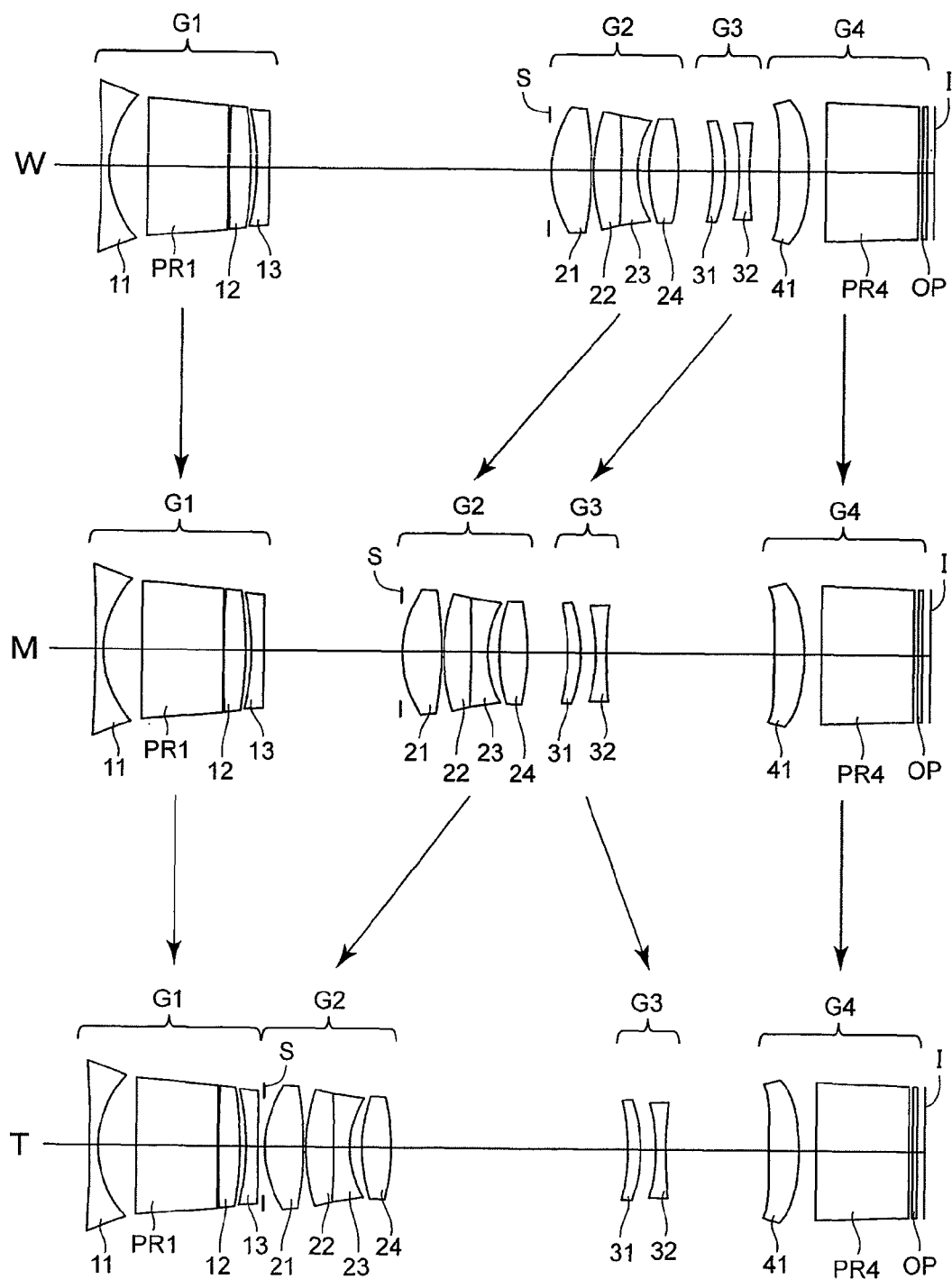
FIG. 3 shows a lens arrangement of a third numerical embodiment of an imaging optical system, according to the present invention, when focused on an object at infinity at the short focal length extremity, an intermediate focal length, and the long focal length extremity, respectively.

FIG. 3 and Tables 11 through 15 show a third numerical embodiment of an imaging optical system according to the present invention. FIG. 3 shows a lens arrangement of the third numerical embodiment of the imaging optical system when focused on an object at infinity at the short focal length extremity, an intermediate focal length, and the long focal length extremity, respectively. Table 11 shows the lens surface data, Table 12 shows various lens-system data, Table 13 shows the aspherical surface data, and Table 14 shows lens group data. Table 15 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the third numerical embodiment is the same as that of the first numerical embodiment except for the following characteristics:

(1) In the first lens group G1, the negative lens element (front lens element/spherically swingable lens group) 11 is configured of a negative meniscus lens element having a convex surface on the object side, and the positive lens element 12 is configured of a biconvex positive lens element.

(2) In the fourth lens group G4, the positive lens element 41 is configured of a positive meniscus lens element having a convex surface on the image side.

TABLE 11

LENS SURFACE DATA

| Surf. No. | r | d | N(d) | νd |
|---|---|---|---|---|
| 1* | 413.329 | 0.400 | 1.61881 | 63.9 |
| 2* | 4.998 | 1.900 | 1.00000 | |
| 3 | ∞ | 4.000 | 2.00100 | 29.1 |
| 4 | ∞ | 0.045 | 1.00000 | |
| 5 | 79.636 | 1.058 | 1.94594 | 18.0 |
| 6 | −20.687 | 0.298 | 1.00000 | |
| 7* | −13.296 | 0.600 | 1.88202 | 37.2 |
| 8* | −3858.572 | d8 | 1.00000 | |
| 9(Diaphragm) | ∞ | 0.000 | 1.00000 | |
| 10* | 5.528 | 1.950 | 1.55332 | 71.7 |
| 11* | −16.564 | 0.116 | 1.00000 | |
| 12 | 10.067 | 1.369 | 1.49700 | 81.6 |
| 13 | −78.480 | 0.800 | 1.91082 | 35.3 |
| 14 | 5.098 | 0.590 | 1.00000 | |
| 15 | 8.443 | 1.434 | 1.59349 | 67.0 |
| 16 | −12.399 | d16 | 1.00000 | |
| 17 | −11.639 | 0.637 | 1.92286 | 20.9 |
| 18 | −7.921 | 0.735 | 1.00000 | |
| 19* | −10.671 | 0.500 | 1.80139 | 45.5 |
| 20* | 20.826 | d20 | 1.00000 | |
| 21* | −719.475 | 1.511 | 1.54358 | 55.7 |
| 22* | −10.717 | 0.870 | 1.00000 | |
| 23 | ∞ | 4.600 | 1.77250 | 49.6 |
| 24 | ∞ | 0.200 | 1.00000 | |
| 25 | ∞ | 0.210 | 1.51680 | 64.2 |
| 26 | ∞ | — | | |

An asterisk (*) designates an aspherical surface which is rotationally symmetrical with respect to the optical axis.

TABLE 12

LENS-SYSTEM DATA
Zoom Ratio: 4.78

| | Short Focal Length Extremity | Intermediate Focal Length | Long Focal Length Extremity |
|---|---|---|---|
| f | 4.10 | 8.96 | 19.60 |
| FNO. | 2.48 | 3.97 | 5.80 |
| W | 37.36 | 19.07 | 8.92 |
| Y | 2.54 | 2.97 | 3.08 |
| L | 41.50 | 41.50 | 41.50 |
| fB | 0.370 | 0.370 | 0.370 |
| d8 | 14.118 | 6.904 | 0.330 |
| d16 | 1.689 | 1.987 | 11.792 |
| d20 | 1.500 | 8.416 | 5.185 |

TABLE 13

ASPHERICAL SURFACE DATA

| Surf. No. | K | A4 | A6 | A8 | A10 |
|---|---|---|---|---|---|
| 1 | 0.0000 | −1.11460E−03 | 4.88785E−05 | −2.35493E−07 | −1.14866E−08 |
| 2 | −0.0743 | −1.31304E−03 | 1.14737E−05 | 5.73374E−07 | 1.44426E−07 |
| 7 | 0.0000 | 8.26077E−05 | −1.23182E−05 | −2.50536E−07 | 1.62564E−07 |
| 8 | 0.0000 | −1.44275E−04 | −1.63341E−05 | 8.84396E−07 | 4.82060E−08 |
| 10 | −3.3388 | 1.88690E−03 | −6.62849E−05 | 3.56631E−06 | −1.31930E−07 |
| 11 | 0.0000 | 5.35022E−04 | −1.21599E−05 | 1.25626E−06 | −8.93156E−08 |
| 19 | 0.0000 | −8.50985E−04 | −6.11072E−05 | 2.58907E−05 | −2.41679E−06 |
| 20 | 0.0000 | −5.52730E−04 | −2.87610E−05 | 1.87358E−05 | −1.76234E−06 |
| 21 | 0.0000 | 5.45326E−04 | −3.20044E−04 | 1.87647E−05 | −9.34587E−07 |
| 22 | 0.0000 | 8.81130E−04 | −3.08260E−04 | 1.47980E−05 | −5.40578E−07 |

TABLE 14

LENS GROUP DATA

| Lens Group | 1$^{st}$ Surface | Focal Length |
|---|---|---|
| 1 | 1 | −7.315 |
| 2 | 10 | 8.212 |
| 3 | 17 | −13.643 |
| 4 | 21 | 19.998 |

TABLE 15

Center Image Height at Telephoto Extremity at 1° Image-Stabilizing Angle

| | |
|---|---|
| Imaging position at C-line (based on d-line) [μm] | 6.60 |
| Imaging position at g-line (based on d-line) [μm] | −1.63 |
| Color shift (C-line-g-line) [μm] | 8.23 |
| Spherical-swinging angle L1 per unit of image-stabilizing angle [°] | 1.36 |

Numerical Embodiment 4

Figure 4:
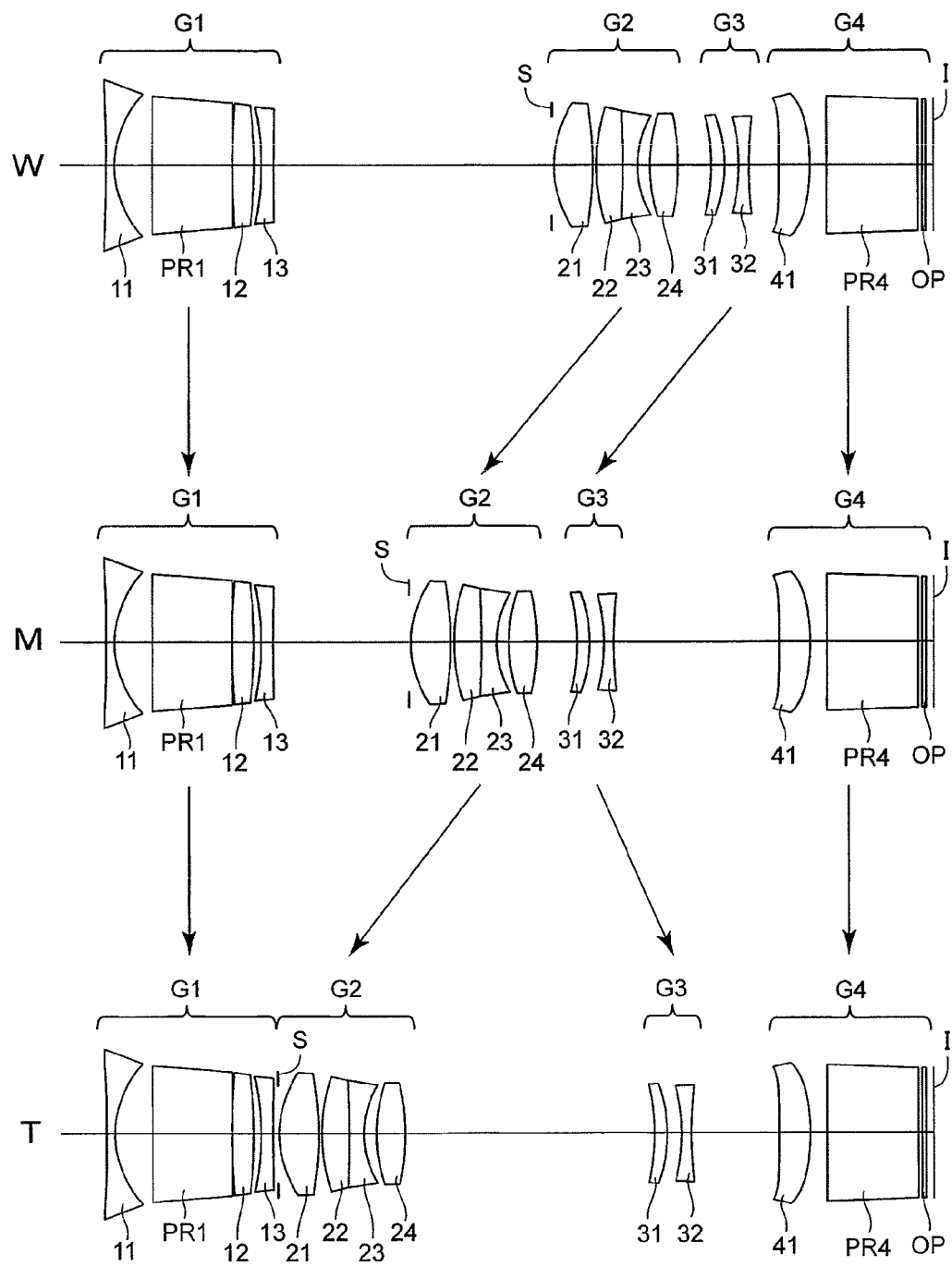
FIG. 4 shows a lens arrangement of a fourth numerical embodiment of an imaging optical system, according to the present invention, when focused on an object at infinity at the short focal length extremity, an intermediate focal length, and the long focal length extremity, respectively.

FIG. 4 and Tables 16 through 20 show a fourth numerical embodiment of an imaging optical system according to the present invention. FIG. 4 shows a lens arrangement of the fourth numerical embodiment of the imaging optical system when focused on an object at infinity at the short focal length extremity, an intermediate focal length, and the long focal length extremity, respectively. Table 16 shows the lens surface data, Table 17 shows various lens-system data, Table 18 shows the aspherical surface data, and Table 19 shows lens group data. Table 20 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the fourth numerical embodiment is the same as that of the first numerical embodiment except for the following characteristics:

(1) In the first lens group G1, the negative lens element (front lens element; spherically swingable lens group) 11 is configured of a negative meniscus lens element having a convex surface on the object side, the positive lens element 12 is configured of a biconvex positive lens element, and the negative lens element 13 is configured of a biconcave negative lens element.

(2) In the fourth lens group G4, the positive lens element 41 is configured of a positive meniscus lens element having a convex surface on the image side.

TABLE 16

LENS SURFACE DATA

| Surf. No. | r | d | N(d) | vd |
|---|---|---|---|---|
| 1* | 497.893 | 0.400 | 1.62263 | 58.2 |
| 2* | 4.978 | 1.900 | 1.00000 | |
| 3 | ∞ | 4.000 | 2.00100 | 29.1 |
| 4 | ∞ | −0.018 | 1.00000 | |
| 5 | 38.486 | 1.088 | 1.94594 | 18.0 |
| 6 | −25.277 | 0.350 | 1.00000 | |
| 7* | −14.534 | 0.600 | 1.88202 | 37.2 |
| 8* | 95.981 | d8 | 1.00000 | |
| 9(Diaphragm) | ∞ | 0.000 | 1.00000 | |
| 10* | 5.567 | 1.967 | 1.55332 | 71.7 |
| 11* | −16.130 | 0.167 | 1.00000 | |
| 12 | 9.737 | 1.359 | 1.49700 | 81.6 |
| 13 | −69.346 | 0.762 | 1.91082 | 35.3 |
| 14 | 5.105 | 0.618 | 1.00000 | |
| 15 | 8.456 | 1.428 | 1.59349 | 67.0 |
| 16 | −12.579 | d16 | 1.00000 | |
| 17 | −11.550 | 0.636 | 1.92286 | 20.9 |
| 18 | −7.904 | 0.727 | 1.00000 | |
| 19* | −10.757 | 0.500 | 1.80139 | 45.5 |
| 20* | 20.576 | d20 | 1.00000 | |
| 21* | −499.340 | 1.526 | 1.54358 | 55.7 |
| 22* | −10.652 | 0.870 | 1.00000 | |
| 23 | ∞ | 4.600 | 1.77250 | 49.6 |
| 24 | ∞ | 0.200 | 1.00000 | |
| 25 | ∞ | 0.210 | 1.51680 | 64.2 |
| 26 | ∞ | — | | |

An asterisk (*) designates an aspherical surface which is rotationally symmetrical with respect to the optical axis.

TABLE 17

LENS-SYSTEM DATA
Zoom Ratio: 4.78

|  | Short Focal Length Extremity | Intermediate Focal Length | Long Focal Length Extremity |
|---|---|---|---|
| f | 4.10 | 8.96 | 19.60 |
| FNO. | 2.48 | 3.96 | 5.76 |
| W | 37.36 | 19.07 | 8.91 |
| Y | 2.54 | 2.97 | 3.08 |
| L | 41.50 | 41.50 | 41.50 |
| fB | 0.370 | 0.370 | 0.370 |
| d8 | 14.081 | 6.907 | 0.298 |
| d16 | 1.659 | 2.024 | 12.581 |
| d20 | 1.500 | 8.308 | 4.362 |

TABLE 18

ASPHERICAL SURFACE DATA

| Surf. No. | K | A4 | A6 | A8 | A10 |
|---|---|---|---|---|---|
| 1 | 0.0000 | −1.09595E−03 | 4.96628E−05 | −2.57715E−07 | −1.19594E−08 |
| 2 | −0.0698 | −1.32086E−03 | 1.33655E−05 | 6.99625E−07 | 1.33896E−07 |
| 7 | 0.0000 | 9.91934E−05 | −1.00020E−05 | −3.59431E−07 | 1.74622E−07 |
| 8 | 0.0000 | −1.30697E−04 | −1.63717E−05 | 1.08982E−06 | 4.39031E−08 |
| 10 | −3.3623 | 1.85333E−03 | −6.58959E−05 | 3.52759E−06 | −1.25428E−07 |
| 11 | 0.0000 | 5.28876E−04 | −1.27476E−05 | 1.32819E−06 | −8.61335E−08 |
| 19 | 0.0000 | −8.65399E−04 | −5.80561E−05 | 2.49987E−05 | −2.26402E−06 |
| 20 | 0.0000 | −5.54530E−04 | −3.31600E−05 | 2.02614E−05 | −1.86428E−06 |
| 21 | 0.0000 | 5.24430E−04 | −3.19902E−04 | 1.90131E−05 | −9.37217E−07 |
| 22 | 0.0000 | 8.45259E−04 | −3.06099E−04 | 1.49379E−05 | −5.42697E−07 |

TABLE 19

LENS GROUP DATA

| Lens Group | 1st Surface | Focal Length |
|---|---|---|
| 1 | 1 | −7.240 |
| 2 | 10 | 8.188 |
| 3 | 17 | −13.591 |
| 4 | 21 | 20.001 |

TABLE 20

Center Image Height at Telephoto Extremity at 1° Image-Stabilizing Angle

| | |
|---|---|
| Imaging position at C-line (based on d-line) [μm] | 7.25 |
| Imaging position at g-line (based on d-line) [μm] | −1.80 |
| Color shift (C-line-g-line) [μm] | 9.05 |
| Spherical-swinging angle L1 per unit of image-stabilizing angle [°] | 1.35 |

Numerical Embodiment 5

Figure 5:
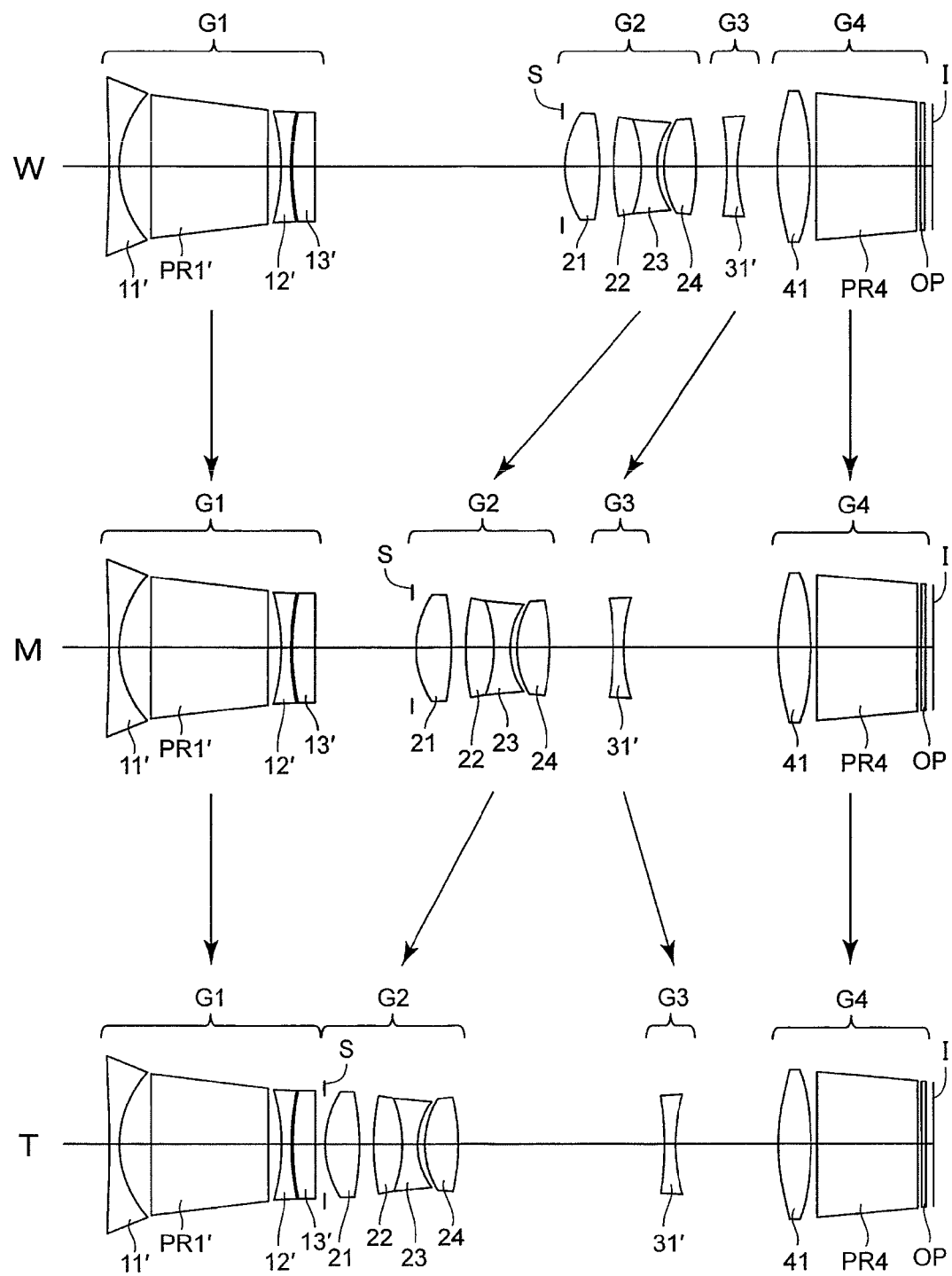
FIG. 5 shows a lens arrangement of a fifth numerical embodiment of an imaging optical system, according to the present invention, when focused on an object at infinity at the short focal length extremity, an intermediate focal length, and the long focal length extremity, respectively.

FIG. 5 and Tables 21 through 25 show a fifth numerical embodiment of an imaging optical system according to the present invention. FIG. 5 shows a lens arrangement of the fifth numerical embodiment of the imaging optical system when focused on an object at infinity at the short focal length extremity, an intermediate focal length, and the long focal length extremity, respectively. Table 21 shows the lens surface data, Table 22 shows various lens-system data, Table 23 shows the aspherical surface data, and Table 24 shows lens group data. Table 25 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the fifth numerical embodiment is the same as that of the first numerical embodiment except for the following characteristics:

(1) The first lens group G1 is configured of a biconcave negative lens element (front lens element) 11', a reflection prism (reflector element) PR1', a biconcave negative lens element 12', and a positive meniscus lens element 13' having a convex surface on the object side, in that order from the object side. An aspherical surface is formed on each side of the biconcave negative lens element (front lens element) 11'. The biconcave negative lens element (front lens element) 11' constitutes a spherically-swingable lens group for suppressing (stabilizing) image shake occurring on the imaging plane I by spherically swinging about a predetermined spherical-swing center (point) in accordance with hand-shake or vibrations, etc., that are applied against the imaging optical system.

(2) The third lens group G3 is configured of a biconcave negative single lens element 31'.

TABLE 21

LENS SURFACE DATA

| Surf. No. | r | d | N(d) | vd |
|---|---|---|---|---|
| 1* | −57.878 | 0.500 | 1.59201 | 67.0 |
| 2* | 5.604 | 1.583 | 1.00000 | |
| 3 | ∞ | 5.815 | 1.83481 | 42.7 |
| 4 | ∞ | 0.647 | 1.00000 | |
| 5 | −10.678 | 0.500 | 1.51680 | 64.2 |
| 6 | 13.529 | 0.100 | 1.00000 | |
| 7 | 14.225 | 1.094 | 2.00100 | 29.1 |
| 8 | 2811.388 | d8 | 1.00000 | |
| 9 (Diaphragm) | ∞ | 0.000 | 1.00000 | |
| 10* | 4.996 | 1.717 | 1.55332 | 71.7 |
| 11* | −12.988 | 0.705 | 1.00000 | |
| 12 | 12.825 | 1.404 | 1.59282 | 68.6 |
| 13 | −7.083 | 0.800 | 1.83481 | 42.7 |
| 14 | 3.917 | 0.353 | 1.00000 | |
| 15 | 4.789 | 1.618 | 1.49700 | 81.6 |
| 16 | −11.244 | d16 | 1.00000 | |
| 17 | −16.974 | 0.550 | 1.43700 | 95.1 |
| 18 | 9.011 | d18 | 1.00000 | |
| 19* | 12.144 | 1.588 | 1.54358 | 55.7 |
| 20* | −15.657 | 0.327 | 1.00000 | |
| 21 | ∞ | 4.935 | 1.61800 | 63.4 |

TABLE 21-continued

LENS SURFACE DATA

| Surf. No. | r | d | N(d) | vd |
|---|---|---|---|---|
| 22 | ∞ | 0.200 | 1.00000 | |
| 23 | ∞ | 0.210 | 1.51680 | 64.2 |
| 24 | ∞ | — | | |

An asterisk (*) designates an aspherical surface which is rotationally symmetrical with respect to the optical axis.

TABLE 22

LENS-SYSTEM DATA
Zoom Ratio: 3.84

| | Short Focal Length Extremity | Intermediate Focal Length | Long Focal Length Extremity |
|---|---|---|---|
| f | 3.90 | 8.60 | 14.94 |
| FNO. | 2.75 | 4.37 | 5.78 |
| W | 37.77 | 19.17 | 11.10 |
| Y | 2.46 | 2.85 | 2.90 |
| L | 40.99 | 40.99 | 40.99 |
| fB | 0.370 | 0.370 | 0.370 |
| d8 | 12.434 | 5.060 | 0.511 |
| d16 | 1.540 | 3.156 | 10.282 |
| d18 | 2.000 | 7.759 | 5.181 |

TABLE 23

ASPHERICAL SURFACE DATA (Coefficients not shown are 0.00)

| Surf. No. | K | A4 | A6 | A8 |
|---|---|---|---|---|
| 1 | 0.0000 | −8.04478E−06 | 1.10363E−05 | −1.70802E−07 |
| 2 | 0.0000 | −1.32390E−04 | −8.43031E−06 | 1.45845E−06 |
| 10 | 0.0000 | −6.55041E−04 | −4.06611E−06 | |
| 11 | 0.0000 | 5.63002E−04 | 7.62235E−06 | |
| 19 | 0.0000 | 7.17734E−04 | −9.99230E−05 | 2.11002E−06 |
| 20 | 0.0000 | 9.26918E−04 | −1.32116E−04 | 3.30208E−06 |

TABLE 24

LENS GROUP DATA

| Lens Group | 1st Surface | Focal Length |
|---|---|---|
| 1 | 1 | −7.172 |
| 2 | 10 | 8.303 |
| 3 | 17 | −13.383 |
| 4 | 19 | 12.841 |

TABLE 25

Center Image Height at Telephoto Extremity
at 1° Image-Stabilizing Angle

| | |
|---|---|
| Imaging position at C-line (based on d-line) [μm] | 4.80 |
| Imaging position at g-line (based on d-line) [μm] | −1.19 |
| Color shift (C-line-g-line) [μm] | 5.99 |
| Spherical-swinging angle L1 per unit of image-stabilizing angle [°] | 1.06 |

Numerical Embodiment 6

Figure 6:
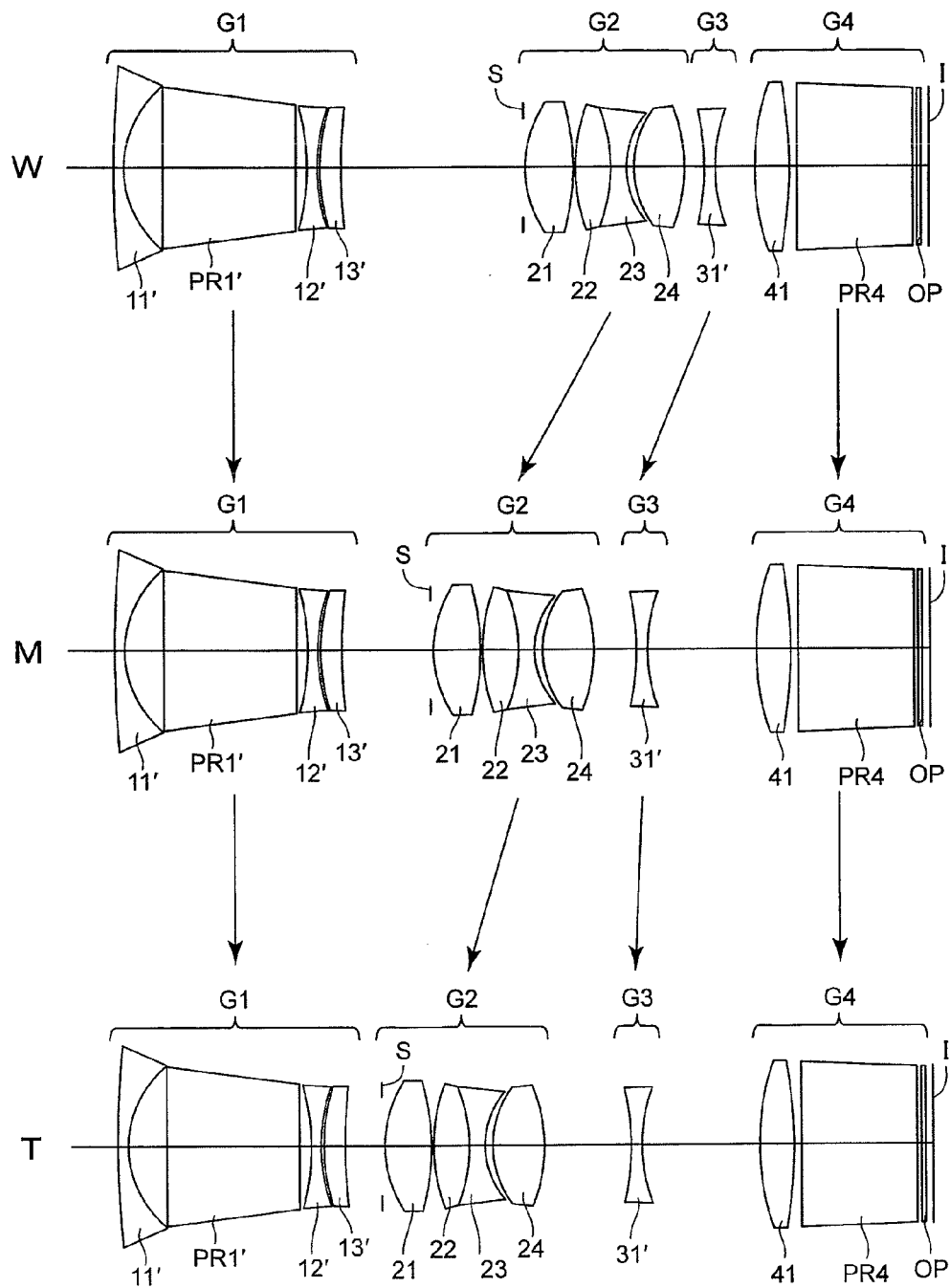
FIG. 6 shows a lens arrangement of a sixth numerical embodiment of an imaging optical system, according to the present invention, when focused on an object at infinity at the short focal length extremity, an intermediate focal length, and the long focal length extremity, respectively.

FIG. 6 and Tables 26 through 30 show a sixth numerical embodiment of an imaging optical system according to the present invention. FIG. 6 shows a lens arrangement of the sixth numerical embodiment of the imaging optical system when focused on an object at infinity at the short focal length extremity, an intermediate focal length, and the long focal length extremity, respectively. Table 26 shows the lens surface data, Table 27 shows various lens-system data, Table 28 shows the aspherical surface data, and Table 29 shows lens group data. Table 30 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the sixth numerical embodiment is the same as that of the first numerical embodiment except for the following characteristics:

(1) The first lens group G1 is configured of a negative meniscus lens element (front lens element) 11' having a convex surface on the object side, a reflection prism (reflector element) PRP, a biconcave negative lens element 12', and a positive meniscus lens element 13' having a convex surface on the object side, in that order from the object side. An aspherical surface is formed on each side of the negative meniscus lens element (front lens element) 11'. The negative meniscus lens element (front lens element) 11' constitutes a spherically-swingable lens group for suppressing (stabilizing) image shake occurring on the imaging plane I by spherically swinging about a predetermined spherical-swing center (point) in accordance with vibrations/hand-shake, etc., that are applied against the imaging optical system. (2) The third lens group G3 is configured of a biconcave negative single lens element 31'.

TABLE 26

LENS SURFACE DATA

| Surf. No. | r | d | N(d) | vd |
|---|---|---|---|---|
| 1* | 49.111 | 0.500 | 1.59201 | 67.0 |
| 2* | 5.388 | 1.887 | 1.00000 | |
| 3 | ∞ | 6.591 | 1.83481 | 42.7 |
| 4 | ∞ | 0.580 | 1.00000 | |
| 5 | −11.939 | 0.500 | 1.48749 | 70.4 |
| 6 | 9.540 | 0.133 | 1.00000 | |
| 7 | 10.290 | 1.067 | 2.00100 | 29.1 |
| 8 | 28.484 | d8 | 1.00000 | |
| 9 (Diaphragm) | ∞ | 0.000 | 1.00000 | |
| 10* | 5.817 | 2.355 | 1.55332 | 71.7 |
| 11* | −10.787 | 0.100 | 1.00000 | |
| 12 | 9.336 | 1.763 | 1.59282 | 68.6 |
| 13 | −8.353 | 0.800 | 1.83481 | 42.7 |
| 14 | 4.298 | 0.385 | 1.00000 | |
| 15 | 5.089 | 2.527 | 1.43700 | 95.1 |
| 16 | −8.547 | d16 | 1.00000 | |
| 17 | −13.301 | 0.550 | 1.43700 | 95.1 |
| 18 | 8.595 | d18 | 1.00000 | |
| 19* | 15.689 | 1.703 | 1.54358 | 55.7 |
| 20* | −20.320 | 0.358 | 1.00000 | |
| 21 | ∞ | 5.731 | 1.61800 | 63.4 |
| 22 | ∞ | 0.200 | 1.00000 | |
| 23 | ∞ | 0.210 | 1.51680 | 64.2 |
| 24 | ∞ | — | | |

An asterisk (*) designates an aspherical surface which is rotationally symmetrical with respect to the optical axis.

TABLE 27

LENS-SYSTEM DATA
Zoom Ratio: 2.37

|  | Short Focal Length Extremity | Intermediate Focal Length | Long Focal Length Extremity |
|---|---|---|---|
| f | 4.81 | 8.20 | 11.40 |
| FNO. | 2.44 | 3.31 | 3.93 |
| W | 38.32 | 24.69 | 18.28 |
| Y | 3.14 | 3.55 | 3.68 |
| L | 40.50 | 40.50 | 40.50 |
| fB | 0.377 | 0.377 | 0.377 |
| d8 | 9.184 | 4.577 | 1.965 |
| d16 | 1.000 | 2.123 | 4.295 |
| d18 | 2.000 | 5.485 | 5.924 |

TABLE 28

ASPHERICAL SURFACE DATA

| Surf. No. | K | A4 | A6 | A8 |
|---|---|---|---|---|
| 1 | 0.0000 | −1.46163E−04 | 5.99875E−06 | −7.07285E−08 |
| 2 | 0.0000 | −2.70938E−04 | −6.26339E−08 | 2.12433E−08 |
| 10 | 0.0000 | −5.21061E−04 | −4.32213E−06 | −1.20903E−07 |
| 11 | 0.0000 | 5.99071E−04 | −5.99544E−06 | 2.12931E−07 |
| 19 | 0.0000 | 5.08712E−04 | −2.32495E−05 | 6.10136E−07 |
| 20 | 0.0000 | 5.26876E−04 | −2.56073E−05 | 5.83607E−07 |

TABLE 29

LENS GROUP DATA

| Lens Group | 1$^{st}$ Surface | Focal Length |
|---|---|---|
| 1 | 1 | −6.964 |
| 2 | 10 | 7.752 |
| 3 | 17 | −11.858 |
| 4 | 19 | 16.563 |

TABLE 30

Center Image Height at Telephoto Extremity
at 1° Image-Stabilizing Angle

| Imaging position at C-line (based on d-line) [μm] | 3.59 |
|---|---|
| Imaging position at g-line (based on d-line) [μm] | −0.89 |
| Color shift (C-line-g-line) [μm] | 4.48 |
| Spherical-swinging angle L1 per unit of image-stabilizing angle [°] | 1.72 |

Numerical Embodiment 7

Figure 7:
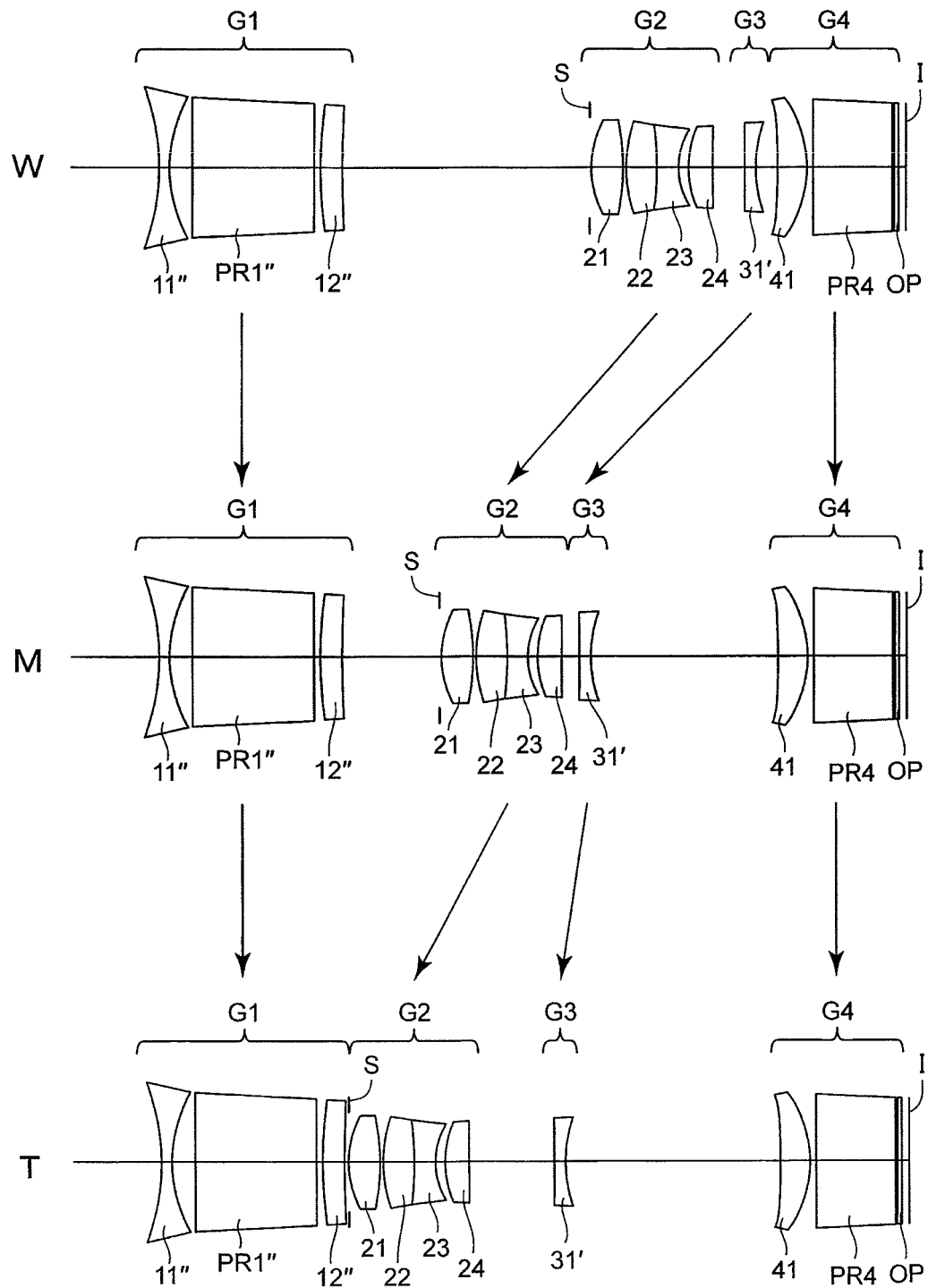
FIG. 7 shows a lens arrangement of a seventh numerical embodiment of an imaging optical system, according to the present invention, when focused on an object at infinity at the short focal length extremity, an intermediate focal length, and the long focal length extremity, respectively.

FIG. 7 and Tables 31 through 35 show a seventh numerical embodiment of an imaging optical system according to the present invention. FIG. 7 shows a lens arrangement of the seventh numerical embodiment of the imaging optical system when focused on an object at infinity at the short focal length extremity, an intermediate focal length, and the long focal length extremity, respectively. Table 31 shows the lens surface data, Table 32 shows various lens-system data, Table 33 shows the aspherical surface data, and Table 34 shows lens group data. Table 35 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the seventh numerical embodiment is the same as that of the first numerical embodiment except for the following characteristics:

(1) The first lens group G1 is configured of a biconcave negative lens element (front lens element) 11", a reflection prism (reflector element) PR1", a positive meniscus lens element 12" having a convex surface on the object side, in that order from the object side. An aspherical surface is formed on each side of the biconcave negative lens element (front lens element) 11". The biconcave negative lens element (front lens element) 11" constitutes a spherically-swingable lens group for suppressing (stabilizing) image shake occurring on the imaging plane I by spherically swinging about a predetermined spherical-swing center (point) in accordance with vibrations/hand-shake, etc., that are applied against the imaging optical system.

(2) The positive lens element 24 of the second lens group G2 is configured of a positive meniscus lens element having a convex surface on the object side (3) The third lens group G3 is configured of a biconcave negative single lens element 31'.

(4) The positive lens element 41 of the fourth lens group G4 is configured of a positive meniscus lens element having a convex surface on the image side.

TABLE 31

LENS SURFACE DATA

| Surf. No. | r | d | N(d) | vd |
|---|---|---|---|---|
| 1* | −11.305 | 0.501 | 1.61881 | 63.9 |
| 2* | 6.544 | 1.138 | 1.00000 | |
| 3 | ∞ | 5.899 | 1.83481 | 42.7 |
| 4 | ∞ | 0.300 | 1.00000 | |
| 5 | 23.360 | 1.052 | 1.94594 | 18.0 |
| 6 | 59.916 | d6 | 1.00000 | |
| 7 (Diaphragm) | ∞ | 0.000 | 1.00000 | |
| 8* | 4.916 | 1.543 | 1.49700 | 81.6 |
| 9* | −10.983 | 0.157 | 1.00000 | |
| 10 | 7.179 | 1.519 | 1.61800 | 63.4 |
| 11 | −17.067 | 1.041 | 1.88300 | 40.8 |
| 12 | 3.740 | 0.478 | 1.00000 | |
| 13 | 5.201 | 1.169 | 1.49700 | 81.6 |
| 14 | 1693.892 | d14 | 1.00000 | |
| 15 | −226.424 | 0.548 | 1.43500 | 95.0 |
| 16 | 6.961 | d16 | 1.00000 | |
| 17* | −42.365 | 1.449 | 1.52538 | 56.3 |
| 18* | −5.144 | 0.300 | 1.00000 | |
| 19 | ∞ | 3.900 | 1.51680 | 64.2 |
| 20 | ∞ | 0.100 | 1.00000 | |
| 21 | ∞ | 0.210 | 1.51680 | 64.2 |
| 22 | ∞ | — | | |

An asterisk (*) designates an aspherical surface which is rotationally symmetrical with respect to the optical axis.

TABLE 32

LENS-SYSTEM DATA
Zoom Ratio: 3.85

|  | Short Focal Length Extremity | Intermediate Focal Length | Long Focal Length Extremity |
|---|---|---|---|
| f | 3.88 | 8.60 | 14.94 |
| FNO. | 2.75 | 4.55 | 6.20 |
| W | 37.37 | 17.62 | 10.17 |
| Y | 2.46 | 2.85 | 2.94 |
| L | 36.55 | 36.55 | 36.55 |
| fB | 0.370 | 0.370 | 0.370 |
| d6 | 12.233 | 4.867 | 0.202 |

TABLE 32-continued

LENS-SYSTEM DATA
Zoom Ratio: 3.85

|  | Short Focal Length Extremity | Intermediate Focal Length | Long Focal Length Extremity |
|---|---|---|---|
| d14 | 1.586 | 0.879 | 4.192 |
| d16 | 1.059 | 9.133 | 10.484 |

TABLE 33

ASPHERICAL SURFACE DATA

| Surf. No. | K | A4 | A6 | A8 |
|---|---|---|---|---|
| 1 | 0.0000 | −3.07472E−04 | 3.16503E−05 | −4.30001E−07 |
| 2 | 0.0000 | −1.26881E−03 | 3.27667E−05 | 4.26085E−07 |
| 8 | 0.0000 | −8.38272E−04 | −1.24613E−05 | 9.62395E−07 |
| 9 | 0.0000 | 6.00926E−04 | 2.94584E−06 | 1.56968E−06 |
| 17 | 0.0000 | 3.79177E−04 | −5.85431E−05 | −7.33881E−06 |
| 18 | 0.0000 | 3.74928E−03 | −1.50964E−04 | −2.33233E−06 |

TABLE 34

LENS GROUP DATA

| Lens Group | 1$^{st}$ Surface | Focal Length |
|---|---|---|
| 1 | 1 | −9.164 |
| 2 | 8 | 8.017 |
| 3 | 15 | −15.513 |
| 4 | 17 | 10.996 |

TABLE 35

Center Image Height at Telephoto Extremity
at 1° Image-Stabilizing Angle

| Imaging position at C-line (based on d-line) [µm] | 5.04 |
|---|---|
| Imaging position at g-line (based on d-line) [µm] | −1.24 |
| Color shift (C-line-g-line) [µm] | 6.28 |
| Spherical-swinging angle L1 per unit of image-stabilizing angle [°] | 0.93 |

Numerical Embodiment 8

Figure 8:
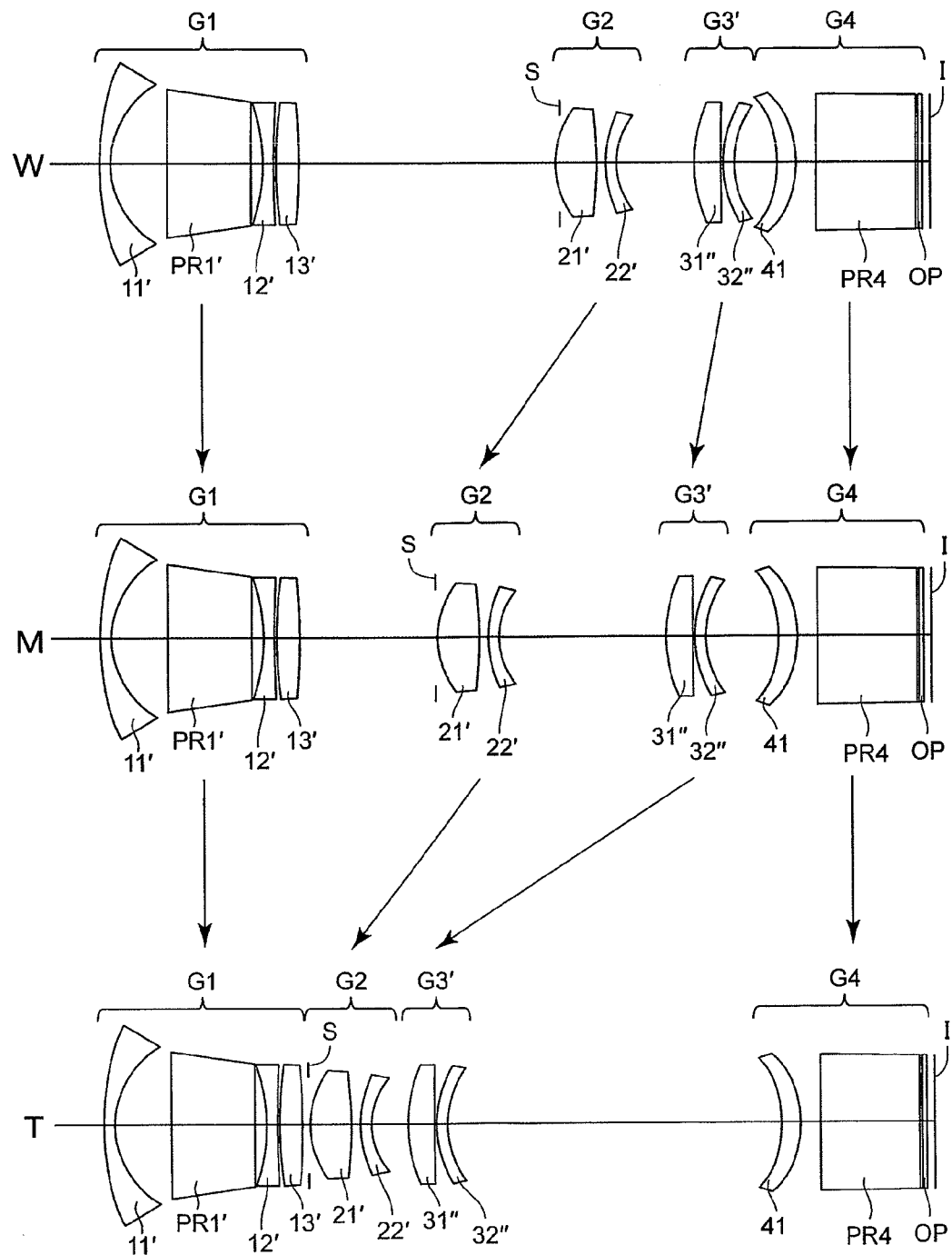
FIG. 8 shows a lens arrangement of a eighth numerical embodiment of an imaging optical system, according to the present invention, when focused on an object at infinity at the short focal length extremity, an intermediate focal length, and the long focal length extremity, respectively.

FIG. 8 and Tables 36 through 40 show an eighth numerical embodiment of an imaging optical system according to the present invention. FIG. 8 shows a lens arrangement of the eighth numerical embodiment of the imaging optical system when focused on an object at infinity at the short focal length extremity, an intermediate focal length, and the long focal length extremity, respectively. Table 36 shows the lens surface data, Table 37 shows various lens-system data, Table 38 shows the aspherical surface data, and Table 39 shows lens group data. Table 40 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the eighth numerical embodiment is the same as that of the first numerical embodiment except for the following characteristics:

(1) The first lens group G1 is configured of a negative meniscus lens element (front lens element) 11' having a convex surface on the object side, a reflection prism (reflector element) PR1', a biconcave negative lens element 12', and a biconvex positive lens element 13', in that order from the object side. An aspherical surface is formed on each side of the negative meniscus lens element (front lens element) 11'. The negative Meniscus lens element (front lens element) 11' constitutes a spherically-swingable lens group for suppressing (stabilizing) image shake occurring on the imaging plane I by spherically swinging about a predetermined spherical-swing center (point) in accordance with handshake or vibrations, etc., that are applied against the imaging optical system.

(2) The second lens group G2 is configured of a biconvex positive lens element 21', and a negative meniscus lens element 22' having a convex surface on the object side, in that order from the object side. Both surfaces of the biconvex positive lens element 21' and both surfaces of the negative meniscus lens element 22' are aspherical surfaces.

(3) A third lens group (rear lens group) G3' having a positive refractive power is used instead of the third lens group (rear lens group) G3 having a negative refractive power (i.e., an arrangement of four lens groups having a negative lens group, a positive lens group, a positive lens group and a positive lens group, in that order from the object side). The third lens group G3' is configured of a positive meniscus lens element 31" having a convex surface on the object side, and a negative meniscus lens element 32" having a convex surface on the object side, in that order from the object side. (4) The positive lens element 41 of the fourth lens group G4 is configured of a positive meniscus lens element having a convex surface on the image side.

TABLE 36

LENS SURFACE DATA

| Surf. No. | r | d | N(d) | vd |
|---|---|---|---|---|
| 1* | 12.842 | 0.500 | 1.61881 | 63.9 |
| 2* | 4.136 | 2.631 | 1.00000 | |
| 3 | ∞ | 3.900 | 2.00069 | 25.5 |
| 4 | ∞ | 0.549 | 1.00000 | |
| 5 | −8.811 | 0.500 | 1.77250 | 49.6 |
| 6 | 62.280 | 0.100 | 1.00000 | |
| 7 | 20.044 | 1.060 | 1.84666 | 23.8 |
| 8 | −33.695 | d8 | 1.00000 | |
| 9(Diaphragm) | ∞ | 0.000 | 1.00000 | |
| 10* | 4.222 | 1.930 | 1.49710 | 81.6 |
| 11* | −14.489 | 0.420 | 1.00000 | |
| 12* | 5.618 | 0.500 | 1.82115 | 24.1 |
| 13* | 3.530 | d13 | 1.00000 | |
| 14 | 7.192 | 1.230 | 1.43700 | 95.1 |
| 15 | 176.896 | 0.100 | 1.00000 | |
| 16 | 5.558 | 0.510 | 1.72342 | 38.0 |
| 17 | 4.574 | d17 | 1.00000 | |
| 18* | −6.184 | 0.870 | 1.54358 | 55.7 |
| 19* | −5.546 | 0.900 | 1.00000 | |
| 20 | ∞ | 4.600 | 1.77250 | 49.6 |
| 21 | ∞ | 0.100 | 1.00000 | |
| 22 | ∞ | 0.210 | 1.51680 | 64.2 |
| 23 | ∞ | — | | |

An asterisk (*) designates an aspherical surface which is rotationally symmetrical with respect to the optical axis.

TABLE 37

LENS-SYSTEM DATA
Zoom Ratio: 3.85

|  | Short Focal Length Extremity | Intermediate Focal Length | Long Focal Length Extremity |
|---|---|---|---|
| f | 3.88 | 6.60 | 14.94 |
| FNO. | 2.76 | 3.65 | 5.76 |

TABLE 37-continued

LENS-SYSTEM DATA
Zoom Ratio: 3.85

|   | Short Focal Length Extremity | Intermediate Focal Length | Long Focal Length Extremity |
|---|---|---|---|
| W | 37.17 | 25.08 | 11.41 |
| Y | 2.56 | 2.87 | 2.94 |
| L | 38.47 | 38.47 | 38.47 |
| fB | 0.370 | 0.370 | 0.370 |
| d8 | 11.858 | 6.338 | 0.345 |
| d13 | 3.636 | 7.797 | 1.031 |
| d17 | 2.000 | 3.359 | 15.528 |

TABLE 38

ASPHERICAL SURFACE DATA

| Surf. No. | K | A4 | A6 | A8 |
|---|---|---|---|---|
| 1 | 0.0000 | −6.91367E−04 | 4.04577E−05 | −3.13163E−07 |
| 2 | 0.0000 | −1.25896E−03 | −1.21355E−05 | 1.43190E−06 |
| 10 | 0.0000 | −9.52037E−04 | 5.09093E−05 | −2.91076E−06 |
| 11 | 0.0000 | 2.49985E−03 | −1.36991E−04 | 3.13634E−06 |
| 12 | 0.0000 | 1.64156E−03 | −2.49061E−04 | −2.09117E−05 |
| 13 | 0.0000 | 1.02248E−03 | −1.17418E−04 | −3.78969E−05 |
| 19 | 0.0000 | 8.11685E−04 | −5.17714E−04 | 1.71643E−05 |
| 20 | 0.0000 | 7.52873E−04 | −3.99873E−04 | 1.27203E−05 |

TABLE 39

LENS GROUP DATA

| Lens Group | 1st Surface | Focal Length |
|---|---|---|
| 1 | 1 | −7.133 |
| 2 | 10 | 10.466 |
| 3 | 14 | 24.693 |
| 4 | 18 | 66.874 |

TABLE 40

Center Image Height at Telephoto Extremity
at 1° Image-Stabilizing Angle

| | |
|---|---|
| Imaging position at C-line (based on d-line) [μm] | 7.25 |
| Imaging position at g-line (based on d-line) [μm] | −1.80 |
| Color shift (C-line-g-line) [ μm] | 9.05 |
| Spherical-swinging angle L1 per unit of image-stabilizing angle [°] | 1.73 |

Comparative Embodiment

Figure 9:
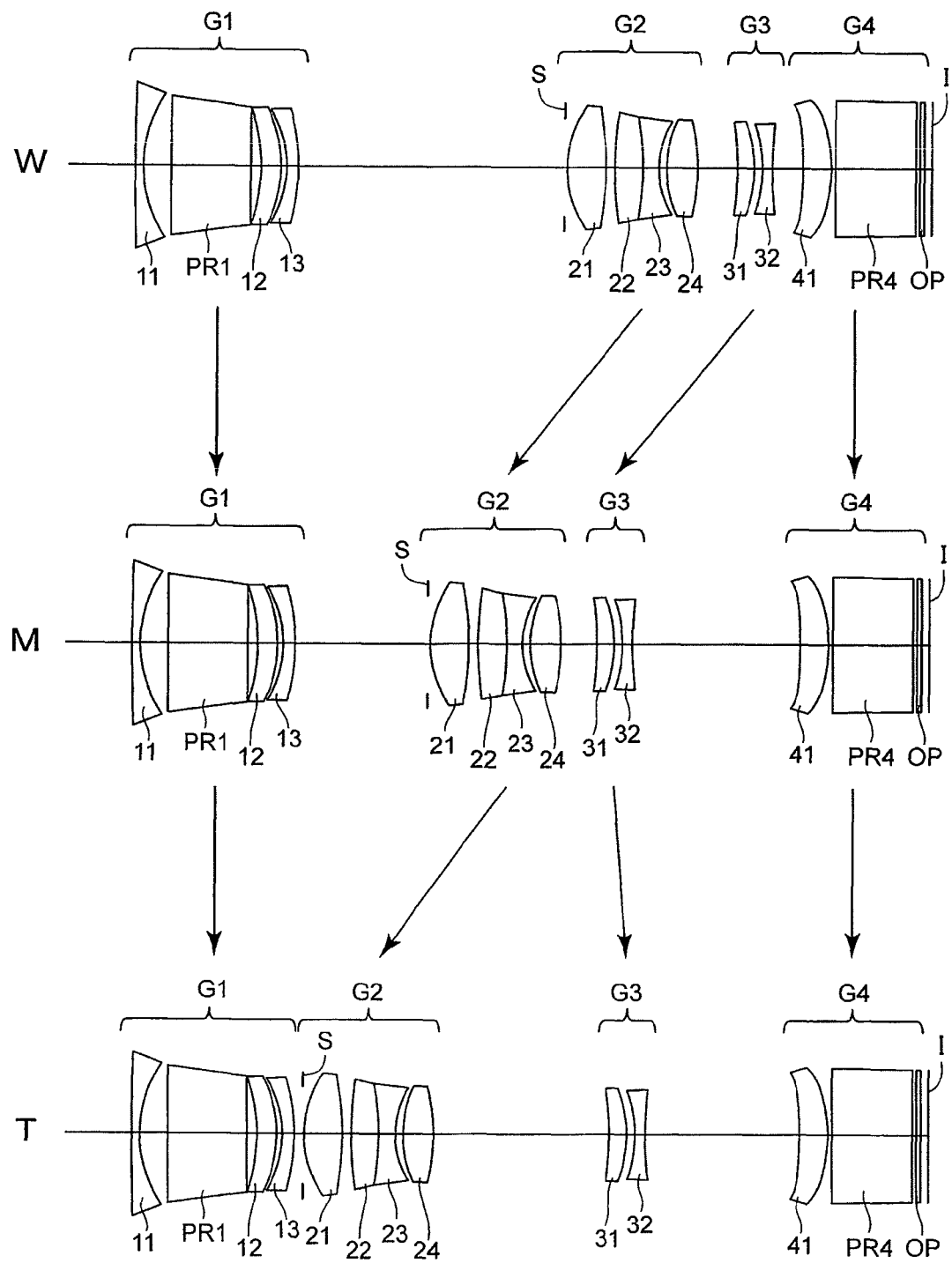
FIG. 9 shows a comparative example of an imaging optical system when focused on an object at infinity at the short focal length extremity, an intermediate focal length, and the long focal length extremity, respectively.

FIG. 9 and Tables 41 through 45 show a comparative embodiment of an imaging optical system. FIG. 9 shows a lens arrangement of the comparative embodiment of the imaging optical system when focused on an object at infinity at the short focal length extremity, an intermediate focal length, and the long focal length extremity, respectively. Table 41 shows the lens surface data, Table 42 shows various lens-system data, Table 43 shows the aspherical surface data, and Table 44 shows lens group data. Table 45 shows data on aberrations (color shift) that occurred during an image-stabilizing driving operation and data on the image-stabilizing sensitivity by indicating various center image heights at the telephoto extremity with respect to an image-stabilizing angle of 1 degree.

The fundamental lens arrangement of the comparative embodiment is the same as that of the first numerical embodiment except for the following characteristics:

(1) The negative lens element 11 of the first lens group G1 is configured of a negative meniscus lens element having a convex surface on the object side, and this negative meniscus lens element 11 is formed from a material having a high dispersion that exceeds (is lower) than the lower limit of condition (1) of the present invention (Abbe number vd at the d-line=49.5).

(2) The positive lens element 41 of the fourth lens group G4 is configured of a positive meniscus lens element having a convex surface on the image side.

TABLE 41

LENS SURFACE DATA

| Surf. No. | r | d | N(d) | vd |
|---|---|---|---|---|
| 1* | 60.816 | 0.400 | 1.77250 | 49.5 |
| 2* | 6.329 | 1.400 | 1.00000 | |
| 3 | ∞ | 4.000 | 1.91082 | 35.3 |
| 4 | ∞ | 0.489 | 1.00000 | |
| 5 | −9.525 | 1.006 | 1.94594 | 18.0 |
| 6 | −6.754 | 0.292 | 1.00000 | |
| 7* | −5.263 | 0.600 | 1.77250 | 49.5 |
| 8* | −10.151 | d8 | 1.00000 | |
| 9(Diaphragm) | ∞ | 0.000 | 1.00000 | |
| 10* | 5.454 | 1.929 | 1.61881 | 63.9 |
| 11* | −13.804 | 0.442 | 1.00000 | |
| 12 | 19.601 | 1.399 | 1.49700 | 81.6 |
| 13 | −15.449 | 0.818 | 1.91082 | 35.3 |
| 14 | 4.652 | 0.385 | 1.00000 | |
| 15 | 5.910 | 1.548 | 1.59349 | 67.0 |
| 16 | −10.691 | d16 | 1.00000 | |
| 17 | −16.746 | 0.877 | 1.78472 | 25.7 |
| 18 | −6.667 | 0.414 | 1.00000 | |
| 19* | −7.634 | 0.500 | 1.82080 | 42.7 |
| 20* | 17.660 | d20 | 1.00000 | |
| 21* | −22.875 | 1.395 | 1.54358 | 55.7 |
| 22* | −7.437 | 0.200 | 1.00000 | |
| 23 | ∞ | 4.000 | 1.91082 | 35.3 |
| 24 | ∞ | 0.200 | 1.00000 | |
| 25 | ∞ | 0.210 | 1.51680 | 64.2 |
| 26 | ∞ | — | | |

An asterisk (*) designates an aspherical surface which is rotationally symmetrical with respect to the optical axis.

TABLE 42

LENS-SYSTEM DATA
Zoom Ratio: 4.71

|   | Short Focal Length Extremity | Intermediate Focal Length | Long Focal Length Extremity |
|---|---|---|---|
| f | 4.11 | 8.96 | 19.37 |
| FNO. | 2.48 | 4.06 | 6.03 |
| W | 37.17 | 19.21 | 8.78 |
| Y | 2.56 | 3.08 | 3.08 |
| L | 40.00 | 40.00 | 40.00 |
| fB | 0.370 | 0.370 | 0.370 |
| d8 | 13.500 | 6.823 | 0.500 |
| d16 | 2.067 | 1.768 | 8.758 |
| d20 | 1.559 | 8.535 | 7.868 |

TABLE 43

ASPHERICAL SURFACE DATA (Coefficients not shown are 0.00)

| Surf. No. | K | A4 | A6 | A8 |
|---|---|---|---|---|
| 1 | 0.0000 | −7.61269E−04 | 3.89686E−05 | −5.50013E−07 |
| 2 | −0.8638 | −5.45865E−04 | 4.18523E−05 | 6.25047E−07 |

TABLE 43-continued

ASPHERICAL SURFACE DATA (Coefficients not shown are 0.00)

| Surf. No. | K | A4 | A6 | A8 |
|---|---|---|---|---|
| 7 | 0.0000 | 8.93254E−04 | −1.03024E−05 | |
| 8 | 0.0000 | 5.28302E−04 | −2.27196E−05 | |
| 10 | −1.1952 | 3.85536E−04 | 6.58467E−06 | 2.33672E−07 |
| 11 | 0.0000 | 7.04323E−04 | −3.18758E−06 | |
| 19 | 0.0000 | −1.62345E−03 | 6.39719E−05 | |
| 20 | 0.0000 | −1.14420E−03 | 7.65647E−05 | |
| 21 | 0.0000 | 7.65337E−04 | −1.84305E−04 | −7.37579E−06 |
| 22 | 0.0000 | 2.82047E−03 | −3.20098E−04 | 1.46908E−06 |

TABLE 44

LENS GROUP DATA

| Lens Group | 1$^{st}$ Surface | Focal Length |
|---|---|---|
| 1 | 1 | −7.315 |
| 2 | 10 | 8.020 |
| 3 | 17 | −12.542 |
| 4 | 21 | 19.647 |

TABLE 45

Center Image Height at Telephoto Extremity at 1° Image-Stabilizing Angle

| | |
|---|---|
| Imaging position at C-line (based on d-line) [μm] | 8.59 |
| Imaging position at g-line (based on d-line) [μm] | −2.05 |
| Color shift (C-line-g-line) [μm] | 10.64 |
| Spherical-swinging angle L1 per unit of image-stabilizing angle [°] | 1.24 |

The numerical values of each condition for each of the first through eighth embodiments and the comparative embodiment are shown in Table 46.

TABLE 46

| | Embod. 1 | Embod. 2 | Embod. 3 | Embod. 4 | Embod. 5 |
|---|---|---|---|---|---|
| Cond. (1) | 81.6 | 71.7 | 63.9 | 58.2 | 67.0 |
| Cond. (2) | 6.33 | 6.36 | 6.36 | 6.36 | 5.15 |
| Cond. (3) | −0.95 | −0.99 | −1.02 | −1.02 | −0.82 |
| Cond. (4) | −0.102 | −0.093 | −0.123 | −0.127 | −0.290 |

| | Embod. 6 | Embod. 7 | Embod. 8 | Comparative Embod. |
|---|---|---|---|---|
| Cond. (1) | 67.0 | 63.9 | 63.9 | 49.5 |
| Cond. (2) | 3.10 | 5.08 | 5.08 | 6.29 |
| Cond. (3) | −1.25 | −0.27 | −1.95 | −1.23 |
| Cond. (4) | −0.060 | −0.069 | −0.185 | −0.122 |

As can be understood from Table 46, the first through eighth embodiments satisfy conditions (1) through (4). Furthermore, as can be understood from Tables 5, 10, 15, 20, 25, 30, 35 and 40, the image color shift has been successfully suppressed to a relatively small amount even when the spherically-swingable lens group is spherically swung in order to perform an image-stabilizing operation. Whereas, in the comparative example, condition (1) of the present invention is not satisfied, and as shown in Table 45, the color shift that occurs when the spherically-swingable lens group is spherically swung in order to perform an image-stabilizing operation is relatively large.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging optical system comprising:
 a front lens group including at least one front lens element, and a reflector element which reflects a light bundle that exits from said front lens element, in that order from the object side; and
 a rear lens group provided on the image side of said front lens group,
 wherein said front lens element serves as a spherically-swingable lens group which, in an image-stabilizing operation, suppresses image shake on the imaging plane by spherically-swinging said spherically-swingable lens group about a predetermined spherical-swing center in accordance with vibrations applied to said imaging optical system, and
 wherein the following conditions (1) and (2) are satisfied:

$$\nu d > 58 \qquad (1),$$

and $$f/y > 3 \qquad (2),$$

wherein
 νd designates the Abbe number with respect to the d-line of at least one lens element of said spherically-swingable lens group;
 f designates the focal length of said imaging optical system, in a state where the focal length is at a maximum; and
 y designates the maximum image height of the imaging plane.

2. The imaging optical system according to claim 1, wherein the following condition (3) is satisfied:

$$-2 < SF < 0 \qquad (3),$$

wherein
 SF=(R2+R1)/(R2−R1);
 R1 designates the radius of curvature of the surface closest to the object side on said spherically-swingable lens group; and
 R2 designates the radius of curvature of the surface closest to the image side on said spherically-swingable lens group.

3. The imaging optical system according to claim 1, wherein the following condition (4) is satisfied:

$$-0.3 < (SC - R2)/f1 < 0 \qquad (4),$$

wherein
 SC designates the distance from the surface closest to the image side on said spherically-swingable lens group to said predetermined spherical-swing center;
 R2 designates the radius of curvature of the surface closest to the image side on said spherically-swingable lens group; and
 f1 designates the focal length of said spherically-swingable lens group.

4. The imaging optical system according to claim 1, wherein said spherically-swingable lens group comprises a single lens element.

5. The imaging optical system according to claim 4, wherein said single lens element, which serves as said spherically-swingable lens group, has a negative refractive power.

6. The imaging optical system according to claim 5, wherein said single lens element, which serves as said spherically-swingable lens group, has a concave surface on the image side thereof.

7. The imaging optical system according to claim 5, wherein the surface on the object side of said single lens element, which serves as said spherically-swingable lens group, has a smaller refractive power than the surface on the image side thereof.

8. The imaging optical system according to claim 1, wherein, in a reference state in which said image-stabilizing operation is not carried out, said predetermined spherical-swing center is positioned on an extension of an optical axis, of said spherically-swingable lens group, extending behind an underside of a reflection surface of said reflector element.

9. The imaging optical system according to claim 1, wherein said front lens group comprises a negative single lens element, which serves as said spherically-swingable lens group, having a concave surface on the image side thereof, said reflector element, a positive single lens element having a convex surface on the image side, and a negative single lens element having a concave surface on the object side, in that order from the object side.

10. The imaging optical system according to claim 1, wherein said front lens group comprises a negative single lens element, which serves as said spherically-swingable lens group, having a concave surface on the image side thereof, said reflector element, a biconcave single lens element, and a positive meniscus lens element having a convex surface on the object side.

11. The imaging optical system according to claim 1, wherein said front lens group comprises a negative single lens element, which serves as said spherically-swingable lens group, having a concave surface on the image side thereof, said reflector element, and a positive meniscus lens element having a convex surface on the object side.

* * * * *